United States Patent
D'Angelo et al.

(10) Patent No.: US 12,479,567 B1
(45) Date of Patent: Nov. 25, 2025

(54) INFLATABLE WING

(71) Applicant: D'Angelo Technologies, LLC, Beavercreek, OH (US)

(72) Inventors: Maurissa D'Angelo, Harmony, PA (US); Joseph John D'Angelo, Jr., Beavercreek, OH (US); Dylan Christman, Jamestown, OH (US); Nathan Pinion, Springboro, OH (US); Shawn Page, Columbus, OH (US)

(*) Notice: Subject to any disclaimer, the term of this patent is extended or adjusted under 35 U.S.C. 154(b) by 0 days.

(21) Appl. No.: 18/424,636

(22) Filed: Jan. 26, 2024

Related U.S. Application Data

(60) Provisional application No. 63/441,712, filed on Jan. 27, 2023.

(51) Int. Cl.
  *B64C 3/30* (2006.01)
  *B64D 17/02* (2006.01)
  *B64U 10/50* (2023.01)

(52) U.S. Cl.
  CPC .............. *B64C 3/30* (2013.01); *B64U 10/50* (2023.01); *B64D 17/025* (2013.01)

(58) Field of Classification Search
  CPC .... B64C 3/30; B64C 3/46; B64C 3/16; B64C 3/38; B64C 1/34; B64C 2031/065; B64C 31/06; B64C 31/036; B64U 10/50; B64D 17/025; B64D 17/02; B63H 8/12
  See application file for complete search history.

(56) References Cited

U.S. PATENT DOCUMENTS

| | | | | |
|---|---|---|---|---|
| 2,616,509 A | * | 11/1952 | Thomas | B64C 3/30 416/88 |
| 3,106,373 A | * | 10/1963 | Bain | B64C 3/30 244/119 |
| 3,412,963 A | * | 11/1968 | Struble, Jr. | B64D 17/025 244/152 |
| 3,957,232 A | * | 5/1976 | Sebrell | B64C 3/30 428/188 |
| 3,987,984 A | * | 10/1976 | Fischer | B64C 3/46 244/219 |
| 4,065,079 A | * | 12/1977 | Winchurch | B64D 17/343 244/152 |
| 6,322,021 B1 | * | 11/2001 | Fisher | B64C 39/10 244/49 |
| 7,938,623 B2 | * | 5/2011 | Cairo | F03D 1/065 416/240 |
| 8,727,280 B1 | * | 5/2014 | Lutke | B64U 30/12 244/123.11 |
| 2002/0172792 A1 | * | 11/2002 | Jarvis | B29C 66/91411 156/227 |
| 2005/0077430 A1 | * | 4/2005 | Preston | B29C 70/30 244/145 |
| 2006/0060706 A1 | * | 3/2006 | Elam | B64U 30/12 244/128 |

(Continued)

FOREIGN PATENT DOCUMENTS

WO WO-2020157341 A1 * 8/2020 ............ B64C 3/182

Primary Examiner — Joshua D Huson
Assistant Examiner — Peter A Taraschi

(57) ABSTRACT

An unmanned aerial vehicle comprising an inflatable wing having a top portion connected to a bottom portion to create a seal, an inflation valve, and internal to the seal created by the top portion and the bottom portion a set of internal cells, and a vehicle portion connected to the inflatable wing.

15 Claims, 19 Drawing Sheets

(56) References Cited

U.S. PATENT DOCUMENTS

| | | | |
|---|---|---|---|
| 2009/0049757 A1* | 2/2009 | Potter | B63B 32/51 441/74 |
| 2009/0108135 A1* | 4/2009 | Shaw | B64D 27/24 244/30 |

* cited by examiner

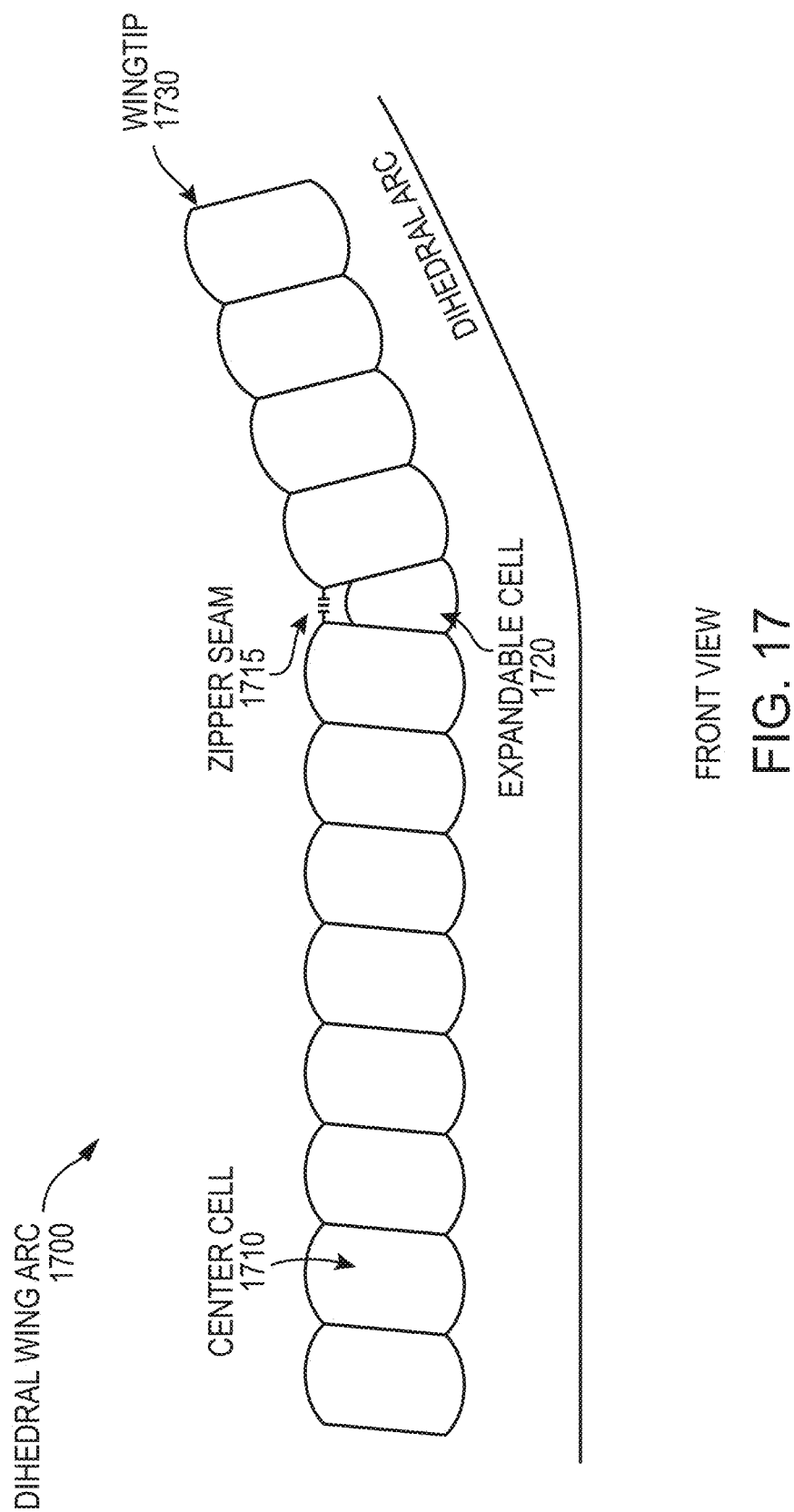

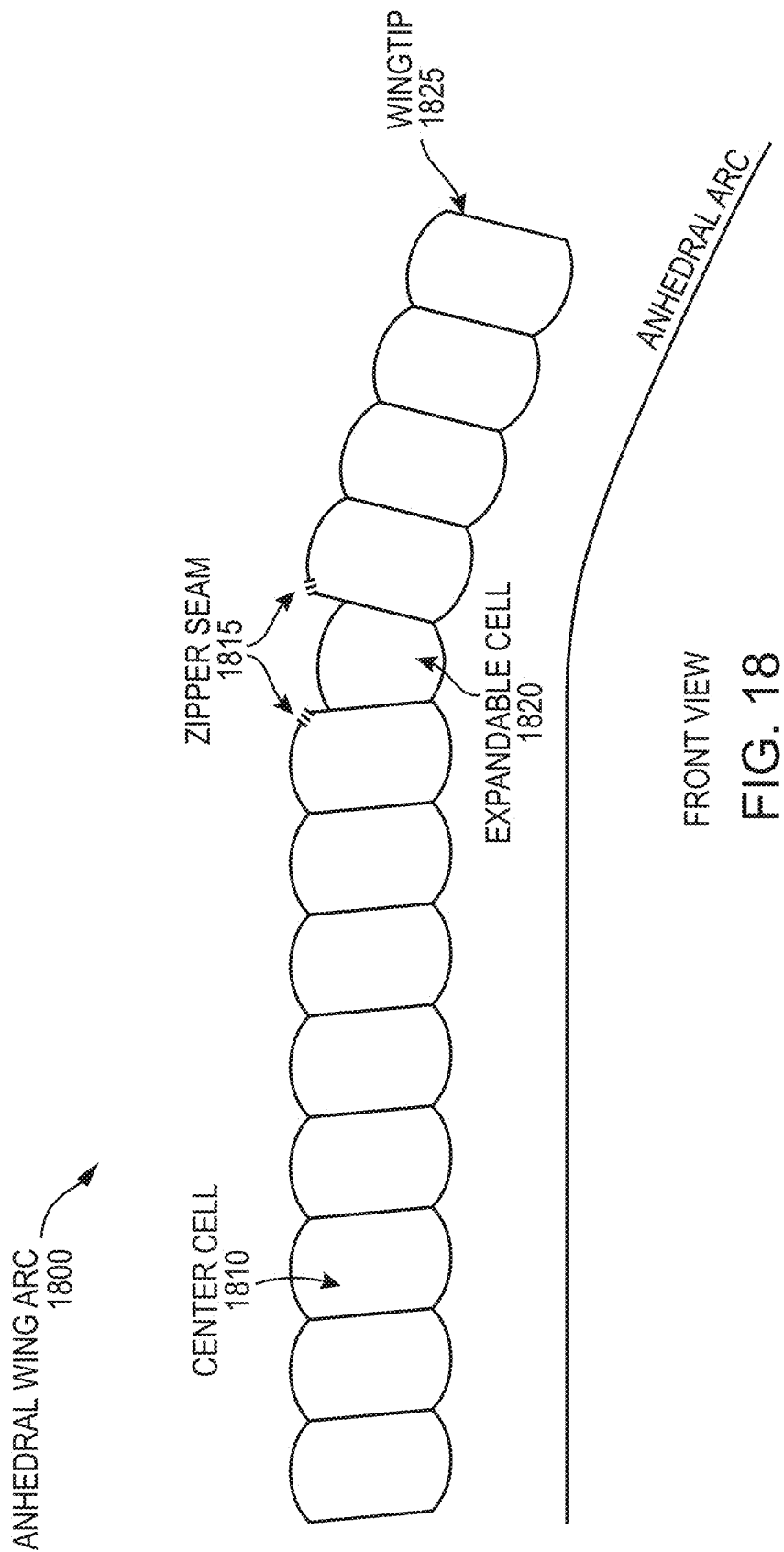

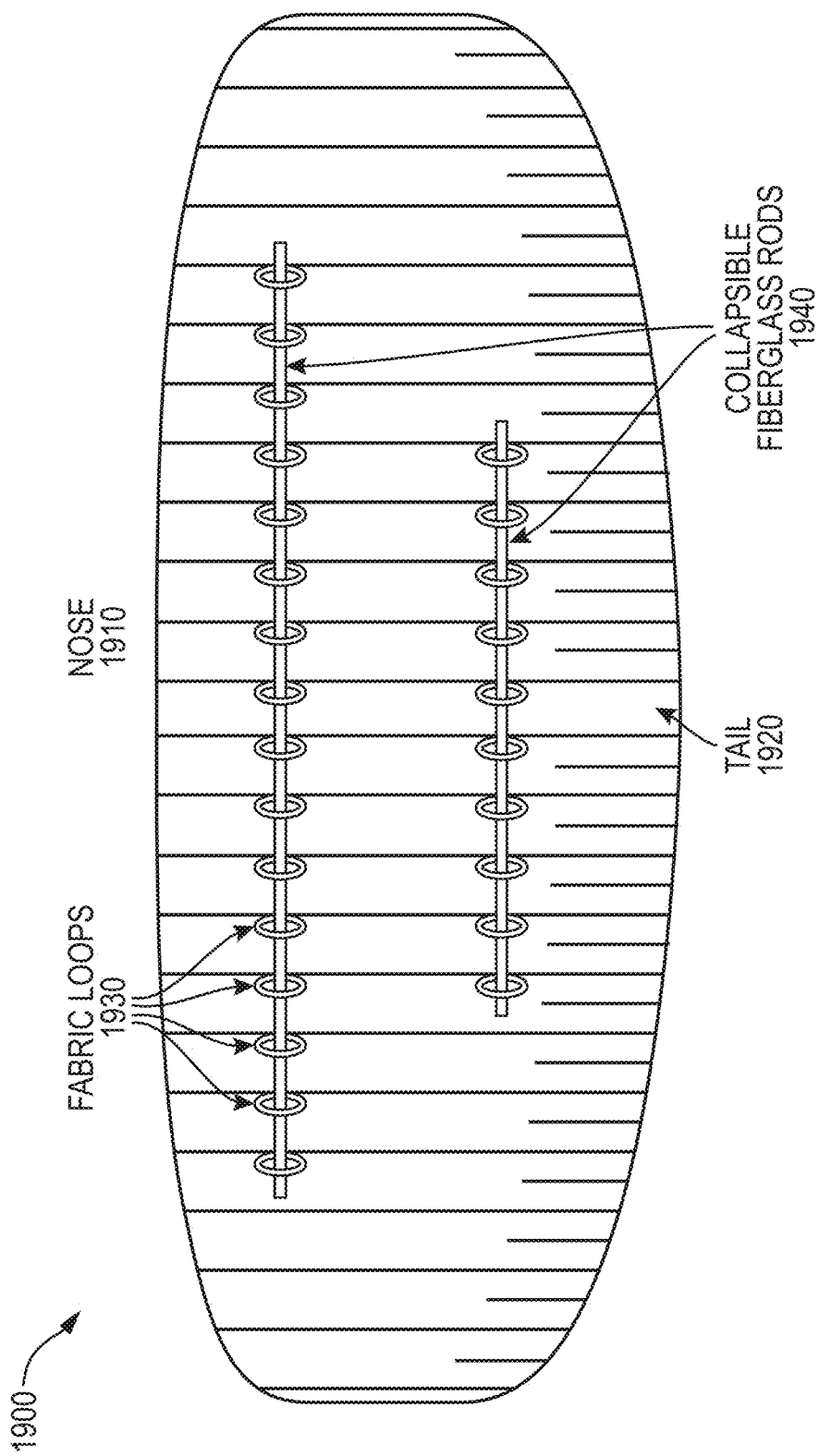

INFLATABLE WING

RELATED APPLICATIONS

This application claims priority to U.S. Provisional Patent Application No. 63/441,712 titled "Inflatable Wing" filed on Jan. 27, 2023, which is hereby incorporated in its entirety by reference for all purposes.

BACKGROUND

Parachutes can slow objects from freefall.

SUMMARY

An unmanned aerial vehicle comprising an inflatable wing having a top portion connected to a bottom portion to create a seal, an inflation valve, and internal to the seal created by the top portion and the bottom portion a set of internal cells, and a vehicle portion connected to the inflatable wing.

BRIEF DESCRIPTION OF THE FIGURES

FIG. 17 illustrates a front view of an inflatable wing with an expandable cell in contracted form with zippered seams shut, with constriction of expandable cell allowing full inflation of the inflatable wing to create a dihedral wing arc at wingtips, in accordance with an embodiment of the current disclosure;

FIG. 18 illustrates a front view of an inflatable wing with an expandable cell in expanded form with zippered seams open, with expansion of expandable cell allowing full inflation of the inflatable wing to create an anhedral wing arc at wingtips, in accordance with an embodiment of the current disclosure; and FIG. 19 illustrates a bottom view of an inflatable wing, indicating its nose and tail, displaying its attachment points via collapsible fiberglass rods threaded through fabric loops, in accordance with an embodiment of the current disclosure.

DETAILED DESCRIPTION

Figure 1:
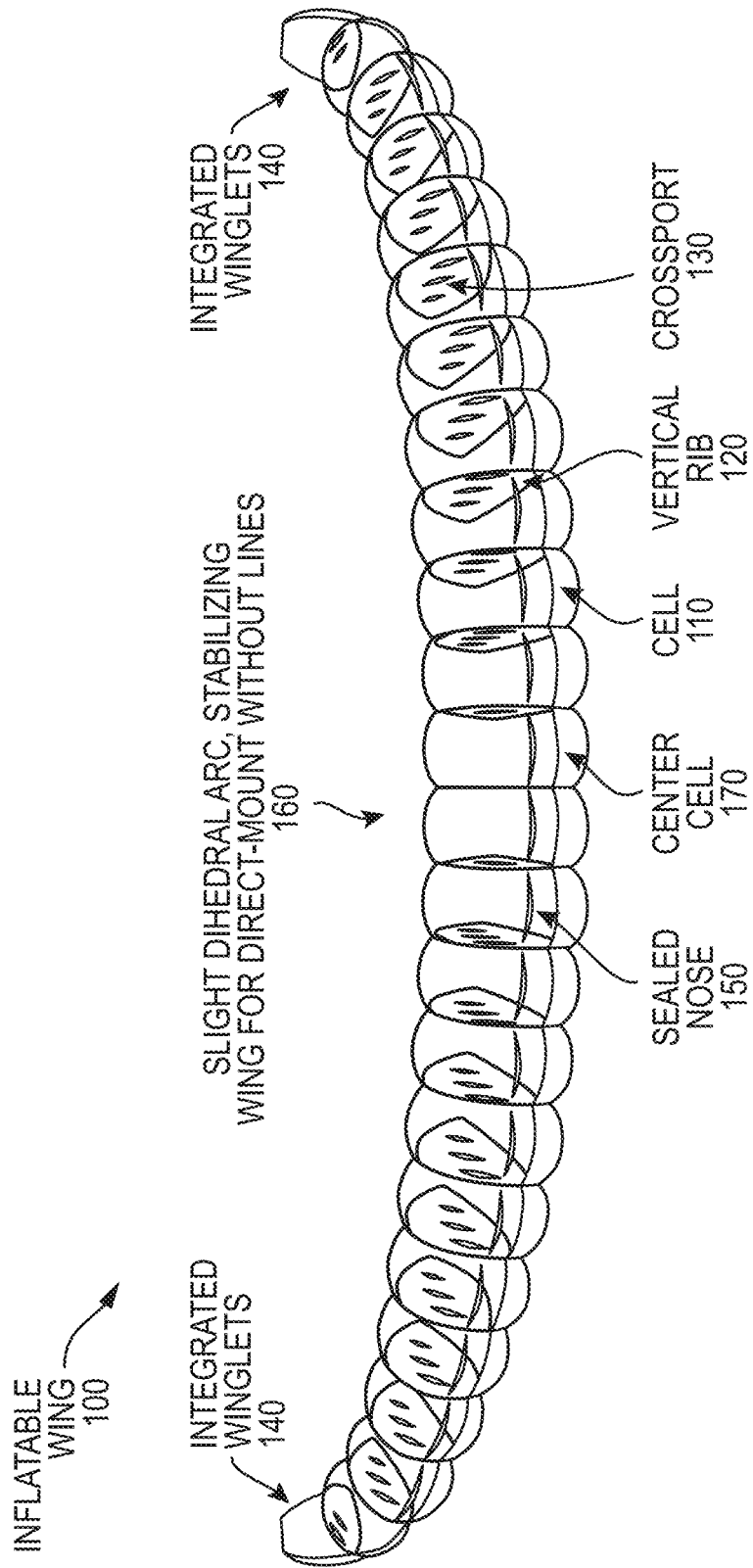
FIG. 1 illustrates a front view of a CAD image of an inflatable wing with cell, vertical rib, crossport, integrated winglets, sealed nose, dihedral arc, and center cell, in accordance with an embodiment of the current disclosure.

Generally, a parafoil is a textile canopy in airfoil shape with an aerodynamic, wind-inflatable structure. Conventionally, a ram-air parachute is a type of parafoil. Usually, ram-air parachutes are shaped like a wing with a top surface and a bottom surface with ribs in between. Typically, a rib is a vertical piece of fabric that connects a top surface to a bottom surface of a parafoil or canopy. Generally, a cell consists of a top surface, a bottom surface, and two ribs for cell walls. Conventionally, each cell must inflate with air in order for a parafoil to be fully inflated. Typically, a ram-air parachute has a "nose" where its top surface and bottom surface remain unsealed for air to enter in order to inflate. Generally, when a ram-air parachute moves forward, it has air forced into its nose to keep it pressurized. Conventionally, as a ram-air parachute moves forward it inflates through its nose and that is what gives it an airfoil shape and generates lift. Usually, lift is a positive contributor to glide ratios. Typically, a ram-air parachute may have a 3:1 glide ratio so a parachutist can move forward and land at a specific spot instead of being subject to wind. Conventionally, a paraglider is another type of parafoil. Generally, paragliders achieve favorable glide ratios. Usually, a parafoil may be folded and packed into a rucksack or other container.

In some embodiments, Applicant has realized that you may compare a parafoil to an airplane wing; a parafoil has an airfoil shape like a wing that generates lift with a curved top and a flat bottom. In most embodiments, Applicant has realized that generating greater lift may be beneficial.

Typically, a rib is a vertical piece of fabric that connects a top surface to a bottom surface of a parafoil or canopy. Usually, "canopy" can be used interchangeably with parachute or parafoil. Conventionally, a rib can either be a "loaded rib" or an "unloaded rib." Generally, a "loaded rib" has support tape and a line attachment at its bottom. Conventionally, a payload or pilot is suspended from a parachute by suspension lines. Typically, suspension lines are usually braided lines that are individually attached to the bottom of a parachute and converge at payload or pilot. Usually, suspension lines are an important part of parachute design, since in addition to suspending pilot or payload, lengths and configurations of suspension lines form a structural element of parachute design. Generally, support tape is a variety of lightweight webbings sewn into a fabric to carry a load and prevent fabric from ripping or stretching. Conventionally, support tape can strengthen seams where two fabric pieces or panels meet.

Usually, parafoils are comprised of a harness hanging beneath a wing made of fabric cells. Typically, suspension lines hang down from the canopy of a parafoil to connect the harness to the canopy. Generally, suspension lines create drag. Conventionally, drag inhibits lift. Usually, an airplane wing or airfoil does not require suspension lines.

In some embodiments, Applicant has realized that you may achieve greater lift from a parafoil without suspension lines. In other embodiments, Applicant has realized that you may achieve greater lift from an airfoil shape without suspension lines compared to a parafoil with suspension lines.

Generally, manufacturers producing current ram-air canopies utilize common seam sewing techniques to connect canopy segments. Conventionally, sewn seams can be sewn in either shear or peel direction. Typically, on sewn canopies, bottom surface seams are loaded in shear direction and top surface seams are loaded in peel direction. Usually ram-air canopies have a nose section that remains unsewn or unsealed in order to allow air to flow. Generally, as air flows into an open nose or air inlet, each cell with an open nose inflates. Conventionally, crossports are holes cut into ribs or side walls of cells in order to permit airflow between cells. Typically, crossports also allow airflow between canopy cells even to wingtips.

In some embodiments, Applicant has realized that it may be possible to seal an entire airfoil shape. In other embodiments, Applicant has realized that it may be possible to inflate an airfoil that has been entirely sealed. In some embodiments, Applicant has realized that you may achieve greater lift and reduce drag from a parafoil with a sealed nose rather than an open nose.

Generally, a paraglider wing is a fabric wing. Usually, a paraglider canopy is shaped like an elongated, upside down letter U. Conventionally, a paraglider is simple to use. Typically, ease of use is a benefit. Generally, although a paraglider is simple to use, its shape lacks efficiency. Generally, all lift comes off perpendicular to a wing's surface. Usually, towards the tips or ends of the fabric wingspan, very little lift occurs.

In most embodiments, an Unmanned Aerial Vehicle (UAV) may be an aircraft without any human pilots, crew, or passengers on board. In some embodiments, an UAV may be a propeller-driven aircraft, capable of autonomous flight or directed flight via remote human operation of a transmitter. In some embodiments, it may be beneficial to use a UAV with a parafoil. In many embodiments, it may be beneficial to use a UAV with a fixed wing. In almost all embodiments, Applicant has realized that it would be beneficial to be able to use a UAV with an inflatable wing as it may provide portability advantages of a parafoil combined with the performance characteristics of a fixed wing. In many embodiments, a UAV may have a wing and a vehicle portion. In some embodiments, a UAV may have a fixed wing. In certain embodiments, a UAV may have an inflatable wing. In many embodiments, a UAV may have a vehicle or payload portion. In most embodiments, a vehicle or payload portion of a UAV may have a propulsion portion such as a propeller or a fan. In many embodiments, vehicle portion of a UAV may have attachment points to a wing. In certain embodiments, attachment points between a UAC and a wing may be called suspension lines. In certain embodiments, a UAV may have a reconfigurable payload compartment. In some embodiments, a UAV may have landing gear. In many embodiments, a UAV may be able to adjust its center of gravity. In certain embodiments, a UAV may be aeronautically designed. In certain embodiments, a propellor for a UAV may be in the front of the UAV. In other embodiments, a propellor for a UAV may be in the back of the UAV.

In some embodiments, a composite fabric may be unwoven layers of polyethylene fibers, sandwiched between two layers of polyester. In certain embodiments, a composite fabric may be a fabric consisting of two or more different materials, gaining desirable characteristic from each of the materials used.

In some embodiments, the current disclose may enable a redesigned paraglider wing to make it more aerodynamic. In other embodiments, the current disclosure may enable a redesigned paraglider wing to generate more lift. In most embodiments, an inflatable wing may be a sealed wing that can inflate for use and deflate for storage. In some embodiments, a fabric may be used for an inflatable wing. In other embodiments, a composite fabric may be used for an inflatable wing. In further embodiments, a fabric used for an inflatable wing may have shielding properties. In some embodiments, a fabric used for a wing may have a reduced signature. Generally, a signature is how detectable the wing may be using scanning such as radar or IR (infrared radiation). In most embodiments, using a shielded wing may enable reduced threat detection. In many embodiments, an inflatable wing may be patched with an adhesive patch instead of sewing the wing.

In certain embodiments, for paragliders, it may be beneficial to maximize efficiency. Generally, a paraglider's nose inlets allow air in. Typically, when air enters inlets it creates turbulence. Conventionally, turbulence adds to drag. Usually, turbulence decreases efficiency.

In certain embodiments, a sealed wing may produce less turbulence than a wing with air inlets. In other embodiments, a sealed wing may produce less drag than a wing with air inlets. In many embodiments, a sealed wing may increase efficiency.

In some embodiments, a sealed wing may resemble a long raft. In other embodiments, a sealed wing may resemble a parafoil with its nose inlets closed off. In some embodiments, a sealed wing may incorporate additional modifications to its shape.

In certain embodiments of the present disclosure, the same square footage of paraglider material may be laid out flat into a traditional airplane wing (airfoil) shape to gain similar benefits from that wing type's lift. In certain embodiments of the present disclosure, the current disclosure may enable increased flying time by using a more aerodynamic, flatter wing shape. In other embodiments of the present disclosure, the current disclosure may enable increased payload by using a more dynamic, flatter wing shape.

Generally, a sealed wing requires some type of support structure. Typically, a support structure can be rigid, flexible, or both. Conventionally, a rigid support structure requires assembly. Usually, assembly of a rigid support structure takes time. Generally, support structure components would take up space and add weight.

In some embodiments, support structure assembly time may be a deterrent. In other embodiments, space restrictions may make a rigid support structure unfeasible. In certain embodiments, weight restrictions may make a rigid support structure impractical.

In some embodiments, an inflatable wing may be one piece of fabric that has been adhered to itself to form a cavity to hold pressure. In certain embodiments, an inflatable wing may be inflated by blowing air into an inflation valve. In certain embodiments, an inflatable wing may be inflated by attaching and turning on a battery-powered air pump. In some embodiments, an air pump may be powered by a ground based power source such as a battery or plug in outlet. In further embodiments, the inflatable wing may be connected to at UAV that may have power for a pump in the inflatable wing. In certain embodiments, a UAV may have one or more batteries. In some embodiments, a UAV may an engine that generates electricity. In some embodiments, a UAV may have a combustion engine. In other embodiments, a UAV may generate electricity through solar power. In other embodiments, an inflatable wing may have an integrated pump. In some embodiments, an air pump may run continuously. In other embodiments, an air pump may turn on and off. In some embodiments, an inflatable wing may have a pressure sensor that can turn a pump on and off based on pressure. In further embodiments, an inflatable wing may have a manifold that can selectively inflate portions of the wing. In still further embodiments, an inflatable wing may have a pressure sensitive system to direct pressure from the air pump to a subset of the inflatable wing.

Typically, a wing that can be inflated can also be deflated. Usually, an inflatable wing is less bulky when it is deflated than when it is inflated. Typically, a deflated inflatable wing can be folded up. Generally, a deflated inflatable wing can fit into smaller spaces than it can when inflated. Conventionally, a deflated inflatable wing that has been folded up can fit into smaller spaces than it can when it is just deflated.

In some embodiments a deflated inflatable wing may be easily portable. In other embodiments, a deflated inflatable wing may fit into a soldier's rucksack. In many embodiments, the current disclosure may enable an inflatable wing. In some embodiments, a reduction of bulk may be achieved by making a wing that can inflate and deflate as needed.

In most embodiments of the present disclosure, an inflatable wing may consist of a top surface, bottom surface, and ribs in between to maintain an airfoil structure of a wing. In some embodiments, a design may be similar to ram-air parafoils (parachutes and paragliders), with critical differences that minimize inefficiencies inherent in a parafoil structure.

In certain embodiments of the present disclosure, an inflatable wing may differ from a ram-air parafoil. In some embodiments, an inflatable wing may be entirely sealed and get its air pressure from an external source while a ram-air parafoil has air inlets in a nose.

In most embodiments, eliminating air inlets that are inherent in parafoil structure may reduce a wing's drag coefficient. In many embodiments, reducing a wing's drag coefficient may allow for greater efficiency than can be achieved with a parafoil. In certain embodiments, an advantage of a parafoil may be maintained—being able to pack into a compact space when not in use—while one primary source of drag may be eliminated.

In many embodiments, inflating a wing with an external air source may allow for greater wing pressurization than what is possible with a parafoil structure. In certain embodiments, greater pressurization may allow for rigidity, increasing wing responsiveness, and further reducing drag. In some embodiments, inflating a sealed wing with an air pump may allow for greater pressurization and a more rigid wing than may be possible with a ram-air wing. In some embodiments, an inflatable wing may be sealed such that air may be pumped into an inflatable wing, but air may not escape through its seal.

In some embodiments an inflatable wing may be constructed with Dyneema Composite Fabric and assembled using 3M 300LSE adhesive. In many embodiments Dyneema Composite Fabric may be a very lightweight construction material. In other embodiments, for greater durability, a wing may also be constructed from vinyl or a variety of similar materials. In other embodiments, an inflatable wing may be made from a type of composite fabric.

In most embodiments, an inflatable wing may be constructed from flat panels, similar to a parafoil. In many embodiments, these flat panels may be cut on a laser table, hot-knife table, or similar CNC controlled cutting machines.

In some embodiments, an inflatable wing may consist of top surface panels, bottom surface panels, ribs, and mini-ribs. In certain embodiments, ribs in an inflatable wing structure may contain round holes called "crossports." In some embodiments, rib holes may allow air pressure to equalize between cells in a structure, while maintaining an airfoil wing shape. In other embodiments, small triangular panels inside a tail or trailing edge may be "mini-ribs." In many embodiments, mini-ribs may serve as internal structures that split each cell, excluding a center cell where an air pump mounts, in half chord-wise at a tail. In some embodiments, splitting tail cells reduces tail billow and allows for a sharper tail termination angle, further reducing drag.

In some embodiments, an inflatable wing according to one or more techniques of the current disclosure may provide a full size rigid wing that is capable of deflating and packing in a small fraction of the original size of the wing. In certain embodiments, an inflatable wing may allow a wing with a 20 foot wingspan to be transported in a backpack.

In other embodiments, another advantage that an inflatable wing may hold over parafoil structures is an ability to hold a flatter, or even entirely flat, surface. In some embodiments, an inflatable wing may allow for a wider variety of anhedral and dihedral arcs that would not be possible with a parafoil.

Generally, parafoil structures have a strong anhedral arc, due to a structure being dependent upon suspension lines that attach to a common point. Typically, a wingtip is an outer edge or outermost point of a wing.

In some embodiments of the present disclosure, in contrast to parafoil construction's strong anhedral arc, an inflatable wing may allow for flat or dihedral wing arcs. In many embodiments, flat or dihedral wing arcs may have several advantages, including optimizing lift vector and allowing for integrated winglets in design. In certain embodiments, by optimizing a lift vector, a higher percentage of the lift may be upwards instead of sideways or diagonal. In most embodiments, winglets may be small sections that are curved upward or downward on the wingtips. In some embodiments, winglets may work by keeping more high pressure on the bottom and low pressure on top of the wing, limiting spill over. In some embodiments, winglets may limit wingtip vortices and reduce drag. In some embodiments, an inflatable wing may hold an advantage over parafoil structures as a wing may be able to hold a wider range of anhedral or dihedral arcs. In many embodiments, Applicants have realized that parafoils may be limited to an upside-down U shape. In certain embodiments, an inflatable wing can have any arc such as curved upwards, downwards, or flat. In many embodiments, a flatter shape may allow an inflatable wing to have more of the lift to be upward instead of at an angle. In certain embodiments, winglets on very tips of an inflatable wing may be good for reducing drag and increasing efficiency. In many embodiments, selection of an anhedral or dihedral arc may depend on the center of gravity and what sort of stability characteristics are necessary for a craft to have. In most embodiments, Applicant has realized that a ram-air parafoil may be limited to an aggressive anhedral arc, due to the construction with suspension lines and the suspension lines converging at a pilot or payload.

In certain embodiments of the present disclosure, a wing with wingtips curving up instead of curving down may increase aerodynamics. In other embodiments of the present disclosure, a wing with upward curving wingtips may increase efficiency.

In certain embodiments of the present disclosure, an advantage an inflatable wing may hold over traditional parafoil design is absence of suspension lines. Generally, parafoils require suspension lines to be attached to wing bottom, significantly contributing to overall drag. In certain embodiments, an inflatable wing may receive its rigidity from internal pressure and may not require suspension lines, allowing for a significant decrease in overall system drag.

In some embodiments, a parachute may use a technique called cross-bracing to add rigidity to a wing. In some embodiments, an inflatable wing build with higher air pressure may benefit from cross-bracing support at wing attachment points. In some embodiments, for an inflatable wing, cross-bracing may distribute load from attachment point across a larger surface area. In certain embodiments of the current disclosure, design may be compatible with cross-bracing combined with mounting points. In some embodiments, an inflatable wing may have two spanwise fiberglass rods that may be inserted through loops attached on a bottom of ribs and the spanwise fiberglass rods may be attached to mounting points on the craft or UAV. In some embodiments, mounting points on an aircraft or UAV may be a collar or a hose clamp. In other embodiments, one or more fiberglass rods may be used as attachment points to an inflatable wing and to distribute load across the inflatable wing.

In some embodiments of the current disclosure, a wing may mount onto a powered ground-launch vehicle. In some embodiments of a wing mounted onto a powered ground-launch vehicle, a wing may function like a traditional rigid airplane wing rather than a parafoil. In certain embodiments of a wing mounted onto a powered ground-launch vehicle, a wing may need to be ground inflated and cannot be air-launched like a parachute.

In most embodiments of the current disclosure, flying may require additional pitch control when mounted on a craft. In some embodiments of the current disclosure, launching may result in destabilization.

In some embodiments of the current disclosure, an inflatable wing may carry payload. In many embodiments of the current disclosure, payload size may be determined by wing size. In some embodiments of the current disclosure, a large enough wing may be strong enough to hold a human. In many embodiments of the current disclosure, based on similar parafoil sizing used with same UAV aircraft used, two inflatable wing sizes may be used to align with two different selected payload weights. In most embodiments of the current disclosure, a smaller inflatable wing size may support a lighter payload while a larger inflatable wing size may support a heavier payload. In most embodiments of the current disclosure, plans or designs for fabric panels for an inflatable wing may be scalable to different sizes depending upon whether a payload is intended and how heavy a payload is.

Conventionally, a check valve is a one-way air valve. Typically, an open check valve allows a medium to flow but can shut off flow in case of backflow. Usually, different types of check valves exist, including a flap valve. Generally, a flap valve utilizes a hinged flap that opens to allow flow in one direction but closes and seals when pressure occurs from opposite direction. Typically, a check valve can be used along with a pump-based pressure system. Conventionally, an air pump is a type of pump-based pressure system.

In some embodiments, a fully sealed inflatable wing may also have fully sealed individual cells. In some embodiments, a fully sealed inflatable wing with sealed cells may require a method to ensure cells remain inflated, even during circumstances where a cell is punctured or otherwise receives abrasions, tears, and/or holes.

In certain embodiments of the current disclosure, cells may remain inflated through use of one or more of an air pump, check valves, and an internal tube functioning as a manifold. In some embodiments of the current disclosure, an air pump may run continuously to inflate cells even if one or more of the cells have become punctured. In some embodiments of the current disclosure, check valves may permit air to flow from an air pump into a cell if a cell starts to deflate. In some embodiments of the current disclosure, an air pump may run continuously and pressure in a cell may not permit further air to flow into a cell if a cell is fully inflated. In some embodiments, an open check valve may allow a medium to flow freely but may shut off flow in case of backflow.

In some embodiments, a cell may be able to inflate partially, inflate fully, deflate partially, and deflate fully. In some embodiments, it may be beneficial to maintain a state of inflation or deflation of a cell. In some embodiments, during flight, it may be beneficial to maintain full inflation or as close to full inflation of all cells in an inflatable wing to maintain steady pressure for smoother flight. In certain embodiments of the current disclosure, it may be beneficial to maintain a cell's full inflation via use of an air pump to pump air into a cell continuously.

In some embodiments, during inactivity, it may be beneficial to maintain full deflation or as close to full deflation of all cells in an inflatable wing to fold and store an inflatable wing. In certain embodiments of the current disclosure, it may be beneficial to maintain a cell's full deflation via reversing an air pump so that it pulls air out instead of pushing air in.

In some embodiments, when attempting to create a dihedral arc wing shape or perhaps other wing shapes ranging from dihedral arc to flat arc, it may be beneficial to partially inflate or partially deflate a certain cell. In certain embodiments of the current disclosure, a cell's partial inflation or partial deflation may be maintained via enclosing a cell. In certain embodiments of the current disclosure, a cell's partial inflation may be maintained by enclosing a cell within a zippered closure along a cell's two edge seams.

Refer now to the example embodiment of FIG. 1, which illustrates a front view of a CAD drawing of inflatable wing 100. Inflatable wing 100 has 25 inflated cells, such as cell 110. Interior side walls of a cell are called "vertical ribs" or "ribs," such as vertical rib 120. Inflatable wing 100 has holes cut into vertical ribs 120 to allow air to flow between inflated cells 110 called crossports, such as crossport 130. Wingtip cells are angled upward to serve as integrated winglets 140 and increase flight efficiency of inflatable wing 100. Sealed nose 150, without air intake ports, prevents air from entering and leaving. Inflatable wing 100 has a dihedral arc 160, with a lowest point being center cell 170 and highest points being wingtips with integrated winglets 140. This allows for greater stability when mounting directly on an aircraft.

Figure 2:
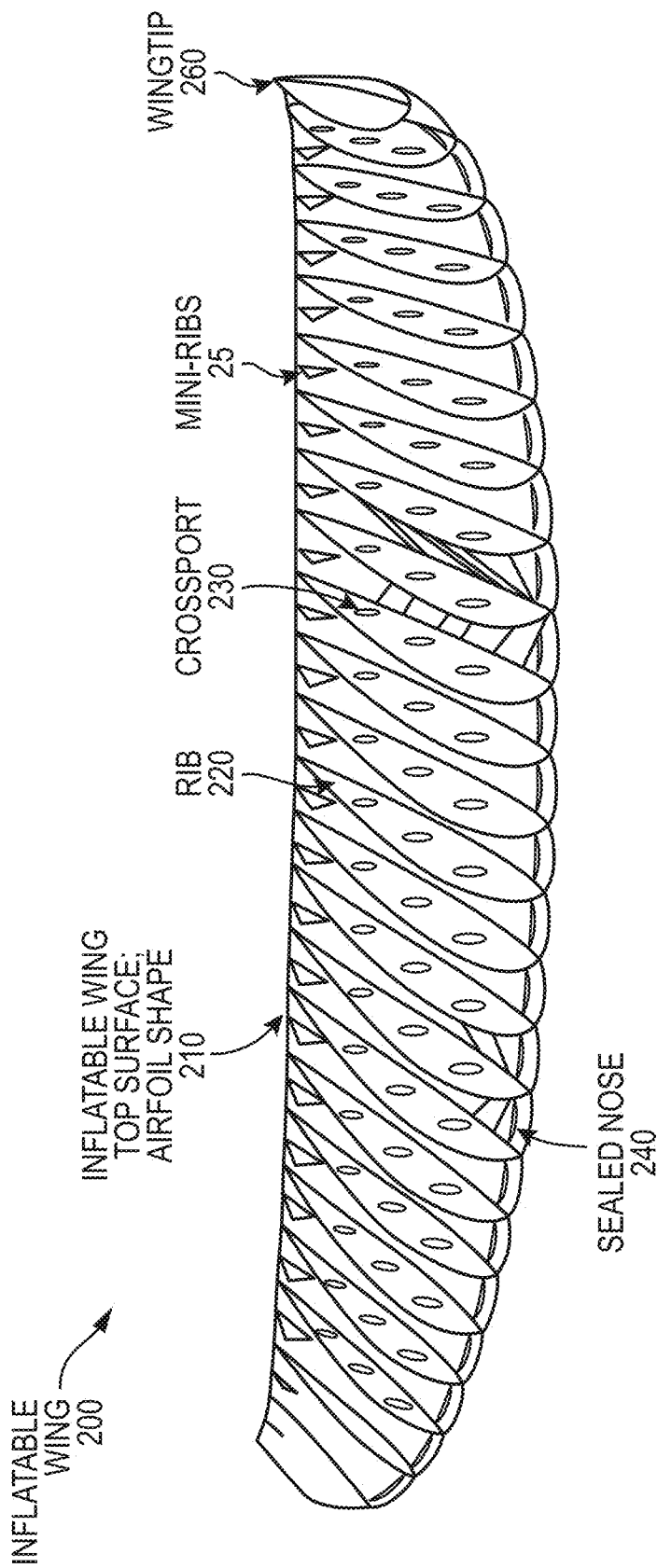
FIG. 2 illustrates a general structure of an inflatable wing from a top surface with transparent surfaces to show its internal structure, including rib, crossport, sealed "nose," mini-ribs, and wingtip, in accordance with an embodiment of the current disclosure.

Refer now to the example embodiment of FIG. 2, which illustrates a transparent model of a top-front view of a CAD drawing of an inflatable wing. The shape of the inflatable wing's top surface can be called an airfoil 210. Ribs help offer structural support by creating sectioned off compartments, as can be seen by rib 220. While ribs provide support, crossports are cut into rib material so that air can flow to fill entire wing 200, as can be illustrated by crossport 230. In some embodiments, a difference between an inflatable wing and a ram-air canopy may be that an inflatable wing is sealed in its entirety whereas a ram-air canopy has air inlets on its nose to allow air to enter.

Referring back to the example embodiment of FIG. 2, sealed nose 240, without any air inlets, allows air to neither enter nor escape from inflatable wing 200. In addition to regular ribs, inflatable wing 200 has mini-ribs 250 at the back of the wing to increase efficiency. Mini-ribs 250 reduce the termination angle of the tail, decreasing turbulence and drag. At the two ends of inflatable wing 200 are the wingtips, such as wingtip 260. Wingtips are curved upwards, acting as integrated winglets. In some embodiments, the larger each cell is, the more rounded off the tail of the canopy may be at the back of the cell. In certain embodiments, mini-ribs may split each cell into two cells making a tail more "pointy" and less rounded off. In many embodiments, a more pointed tail may allow air to flow more cleanly and may reduce turbulence and drag. In some embodiments, at wingtips of a wing, some high pressure below the wing spills around the wing and into a low-pressure area above the wing. In certain embodiments, spilling of pressure may create "wingtip vortices," which may be little tornados coming off of the wingtips. In many embodiments, wingtip vortices may contribute turbulence and drag to the system or wing. In some embodiments, "winglets" may be small vertical sections, usually at wingtips, that may act as a barrier to keep the high pressure below from spilling into low pressure above. In most embodiments, reducing drag may increase efficiency for an inflatable wing.

Figure 3:
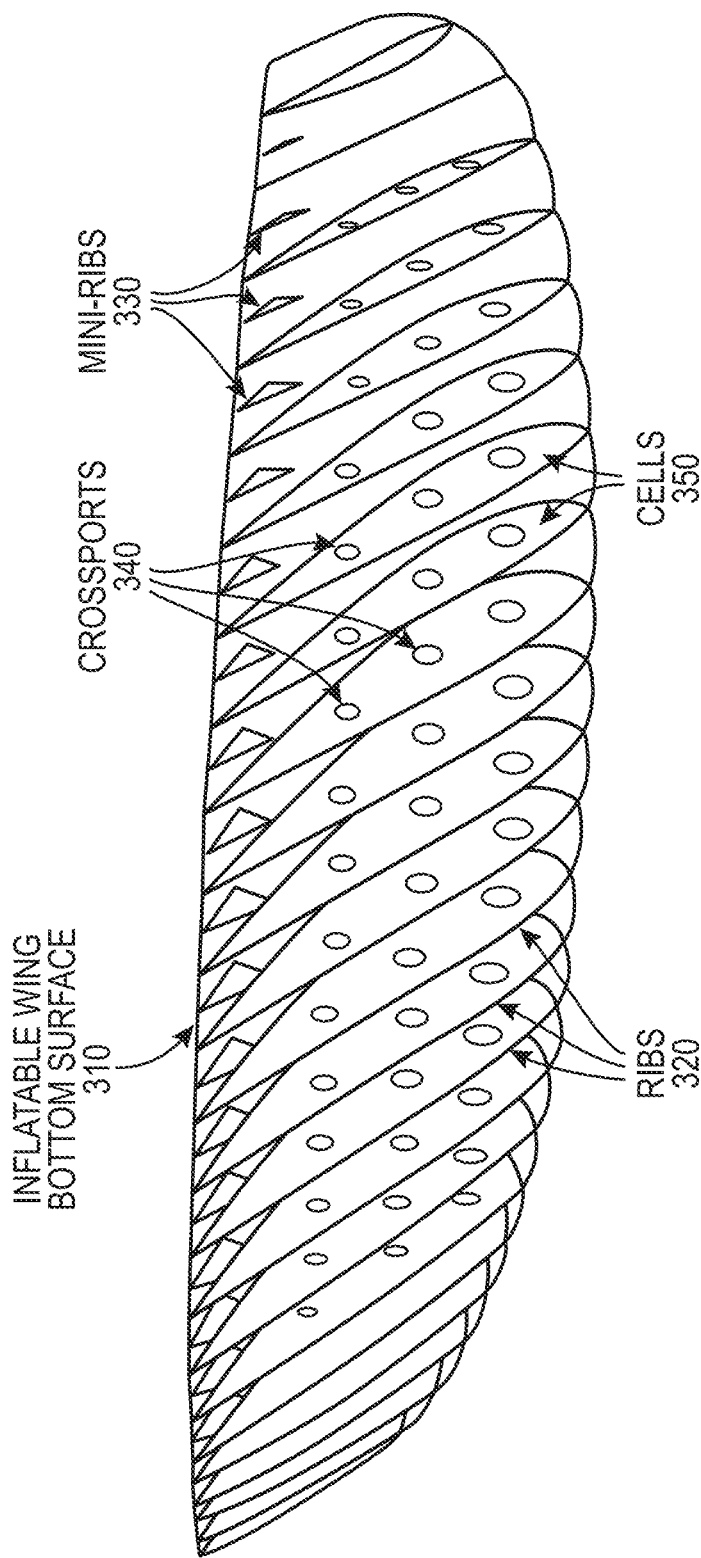
FIG. 3 illustrates a general structure of an inflatable wing from the bottom surface with transparent surfaces to show its internal structure, including ribs, mini-ribs, crossports, and cells, in accordance with an embodiment of the current disclosure.

Refer now to the example embodiment of FIG. 3, which illustrates a transparent model of a bottom-rear view of a CAD drawing of an inflatable wing. Bottom surface 310 provides an alternative view of an inflatable wing as compared to FIG. 2. Three different ribs 320 are shown extending the length of the wing. Several mini-ribs 330 are shown only extending a small portion of the length of the wing, in between regular ribs. Four different crossports 340 show some of the places where air can flow between cells 350. Crossports 340 allow for air pressure equalization between all cells.

Figure 4:
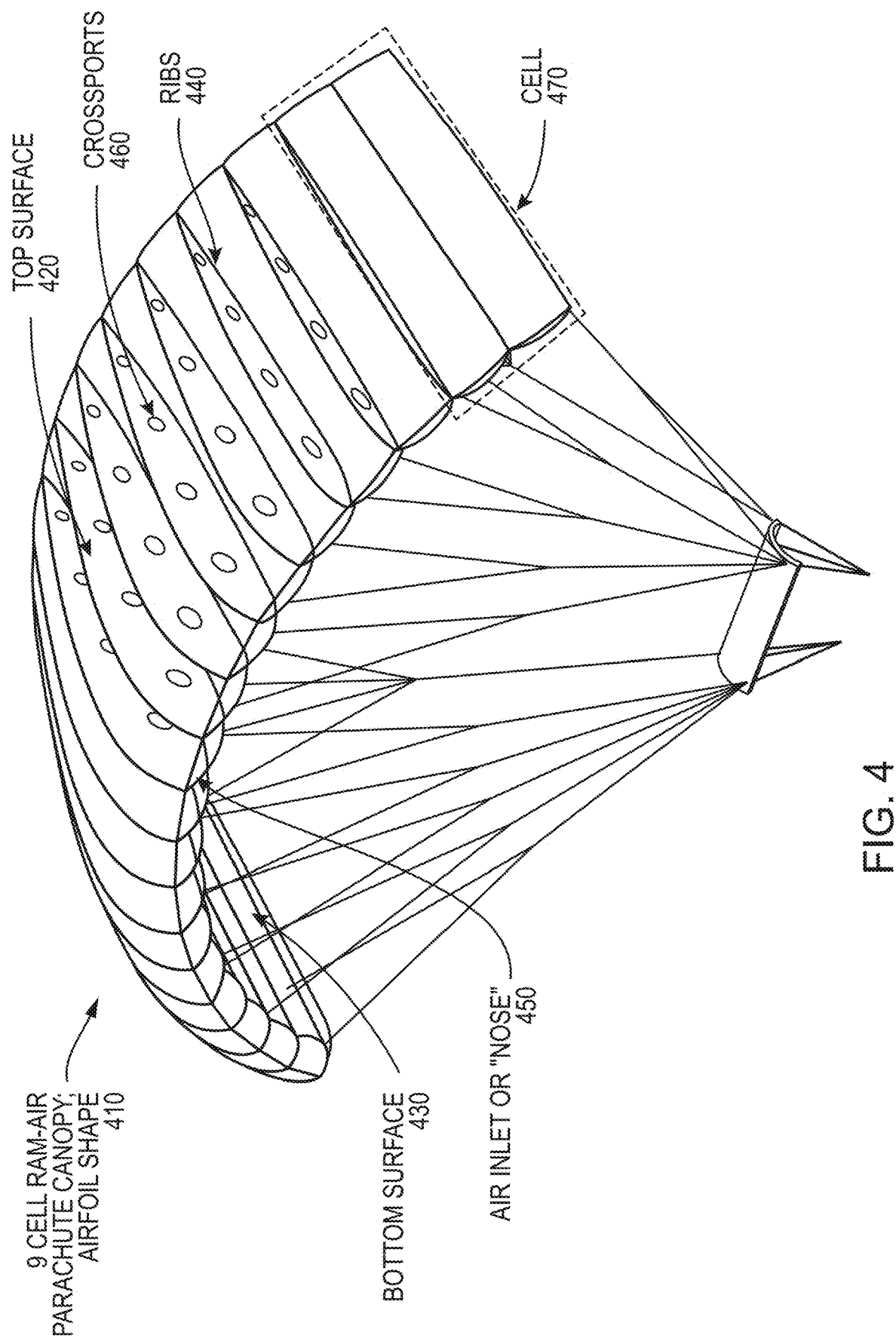
FIG. 4 illustrates a top view of a 9 cell ram-air parachute, including airfoil canopy shape, top surface, bottom surface, ribs, air inlet, crossports, and cell, in accordance with an embodiment of the current disclosure.

Refer now to the example embodiment of FIG. 4, which illustrates a top-front view of a CAD drawing of a 9 cell ram-air parachute. Ram-air parachute's canopy 410 takes an airfoil shape. On a parachute canopy, a top surface 420 and a bottom surface 430 are separated by structural ribs 440, similar to how an inflatable wing has a top surface, bottom surface, and structural ribs. Ribs 440 provide structural support between top 420 and bottom 430 surfaces and create compartments to hold air. An air inlet or "nose" 450 differentiates a ram-air canopy's open nose from a sealed nose of an inflatable wing. Air inlet 450 is used to continuously pressurize cells, such as cell 470, in contrast to an inflatable wing which is sealed. Air enters air inlet 450 and fills each compartment created by top surface 420, bottom surface 430, and ribs 440. In comparison, in most embodiments an inflatable wing has a sealed nose and an air pump to better serve a constant and higher pressure equilibrium, crossports are holes cut in ribs to allow air to flow to extremities of a canopy. Referring back to the example embodiment of FIG. 4, crossports 460 allow for air pressure equalization between all cells, including example embodiment cell 470.

In some embodiments, in a 9-cell ram-air canopy, a cell may consist of a top surface, a bottom surface, and two loaded ribs for the cell walls, an unloaded rib between two loaded ribs for more structural support. In certain embodiments, a ram-air parachute may suspend a payload and/or pilot with many suspension lines. In some embodiments, an inflatable wing may allow for direct attachment of a person or payload.

Figure 5:
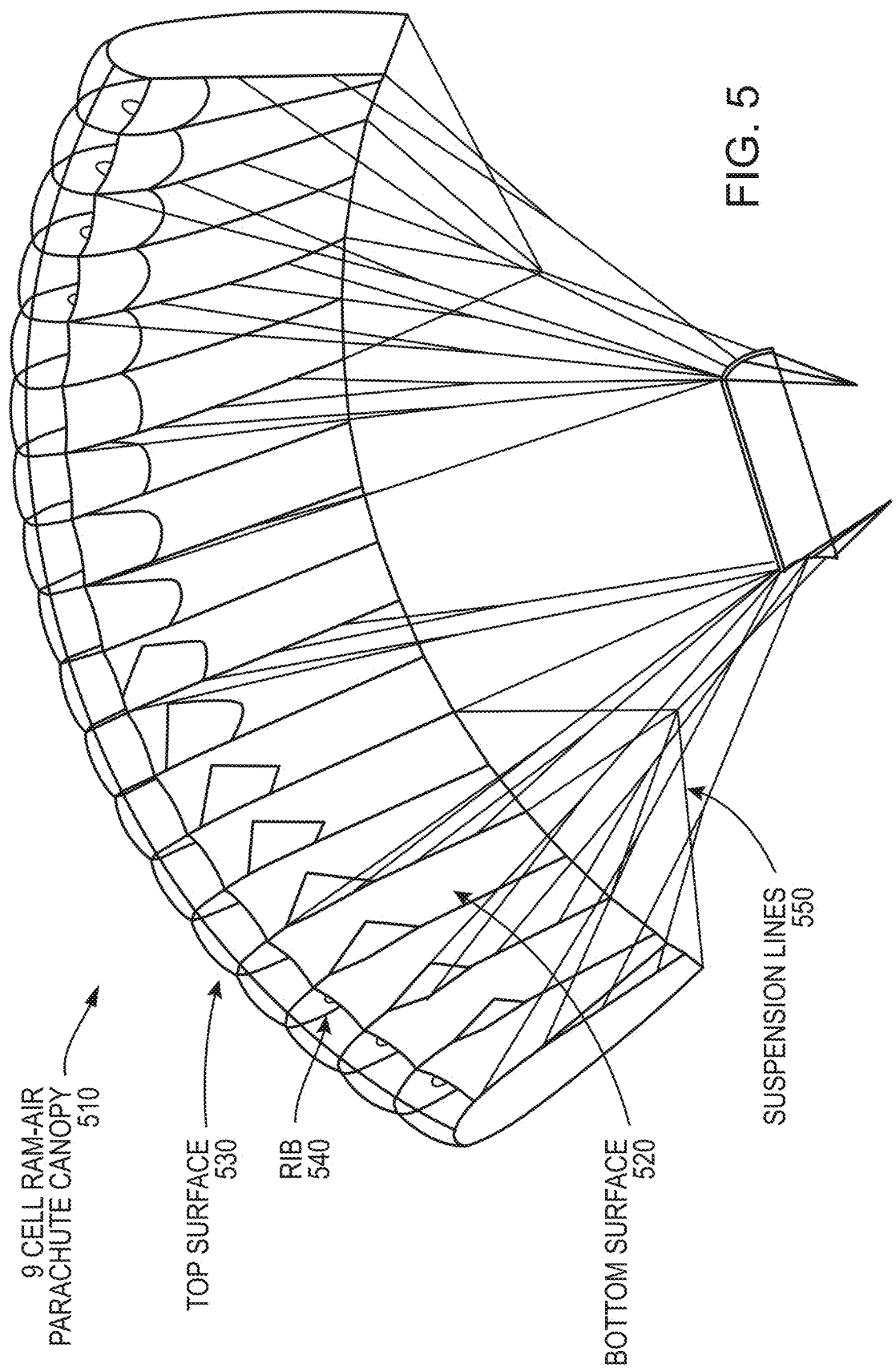
FIG. 5 illustrates a bottom view of a 9 cell ram-air parachute, including bottom surface, top surface, rib, and suspension lines, in accordance with an embodiment of the current disclosure.

Refer now to the example embodiments of FIG. 5, which illustrates a bottom-front view of a CAD drawing of a typical 9 cell ram-air parachute. Canopy 510 from this view highlights its bottom surface 520. Bottom surface 520 and top surface 530 are structurally supported by ribs, including example embodiment rib 540. Suspension lines 550 suspend the payload and/or pilot below the canopy.

Figure 6:
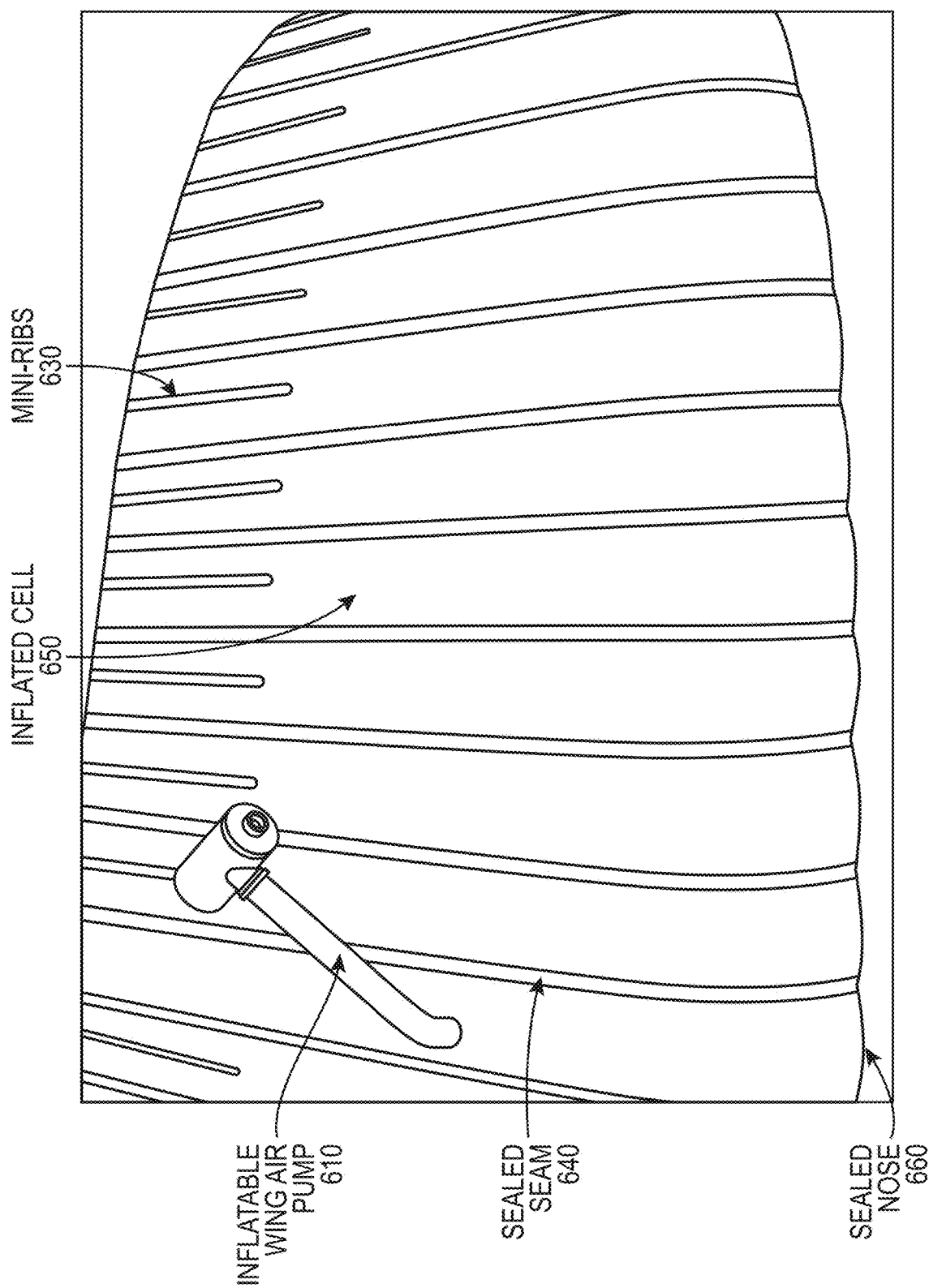
FIG. 6 is an alternative illustration of a smaller version of an inflatable wing, including an air pump, mini-ribs, sealed seam, inflated cell, and sealed nose, in accordance with an embodiment of the current disclosure.

Refer now to the example embodiment of FIG. 6, which shows an example embodiment of a bottom-surface view of a smaller-sized inflatable wing. The FIG. 6 inflatable wing is built from composite materials such as shown in CAD drawing shown in FIGS. 1, 2, and 3. An air pump 610 enables an operator to inflate the wing. Material pieces of the inflatable wing are gradually shorter and the inclusion of mini-ribs 630 reduces the termination angle at the tail and reduces drag. Material pieces are connected to each other using tape which seals the seams of each cell, such as sealed seam 640 and inflated cell 650. Nose 660 is fully sealed, allowing the inflatable wing's cells, such as inflated cell 650, to pressurize to greater levels than possible with a ram-air parachute. In most embodiments, an inflatable wing may be deflated manually. In other embodiments, an inflatable wing may be deflated by running a pump backwards.

Figure 7:
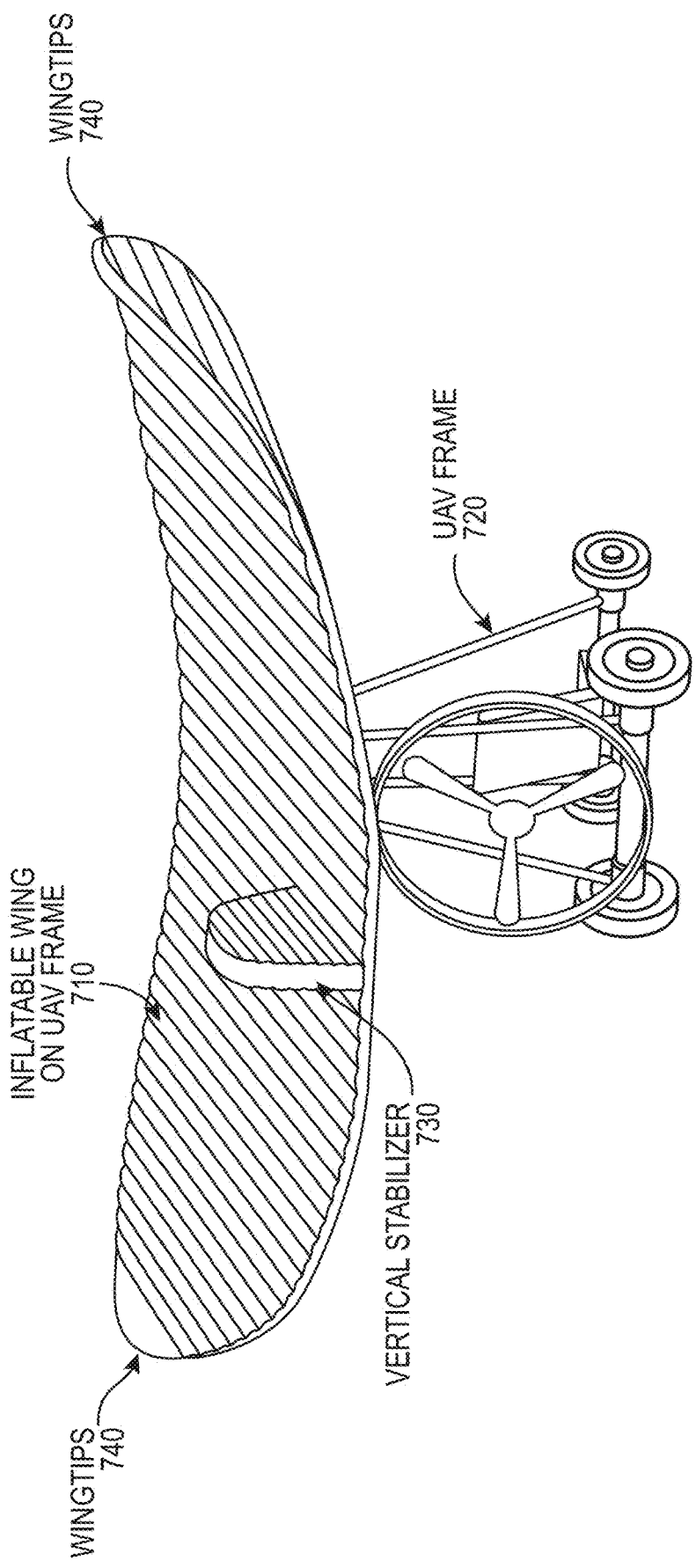
FIG. 7 is a further alternative illustration of a smaller version of an inflatable wing, attached to a UAV frame, highlighting vertical stabilizer and wingtips, in accordance with an embodiment of the current disclosure.

Refer now to the example embodiment of FIG. 7, which shows a rear-right photograph of an inflatable UAV (unmanned aerial vehicle) wing 710 mounted on a remote-control UAV aircraft. FIG. 7 is an example embodiment of a smaller-sized inflatable wing 710, mounted on a remote-control UAV aircraft 720, completing its take-off roll. Inflatable wing 710 is attached to an UAV frame 720; UAV 720 provides the controls and thrust required for flight. Inflatable wing can be utilized on a variety of fixed-wing UAV. This particular wing includes an optional vertical stabilizer 730 which provides additional yaw stability. In other embodiments, a vertical stabilizer, such as vertical stabilizer 730 may not be needed. Referring back to the example embodiment of FIG. 7, wingtips 740 have additional dihedral angle due to the lift generated. This wing is fully inflated prior to takeoff and maintains pressure until it is deflated post-flight.

Figure 8:
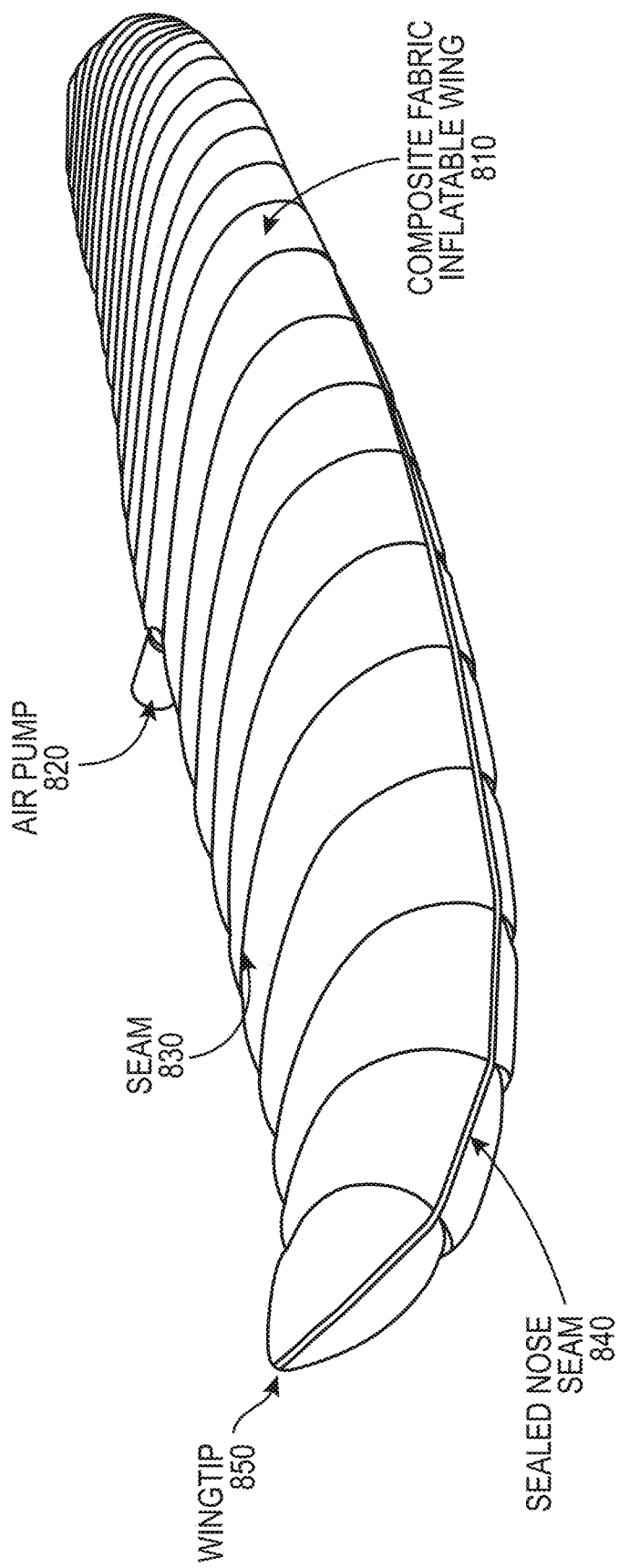
FIG. 8 is an alternate embodiment of an inflatable wing, composed of composite fabric, inflated by an air pump, and with sealed seam, sealed nose seam, and wingtip, in accordance with an embodiment of the current disclosure.

Refer now to the example embodiment of FIG. 8, which illustrates a front-left view of an inflatable wing, in accordance with the CAD drawing in FIGS. 1, 2, and 3. Constructed from composite materials, inflatable wing 810 is made from composite fabric. Air pump 820 is used to inflate the wing 810 prior to flight. Inflatable wing seam 830 is the sealed seam between two adjacent cells and a vertical rib. Nose is sealed with sealed nose seam 840, allowing for greater pressure than is possible on a ram-air parachute. The wingtips 850 are curved upwards, acting as integrated winglets.

Figure 9:
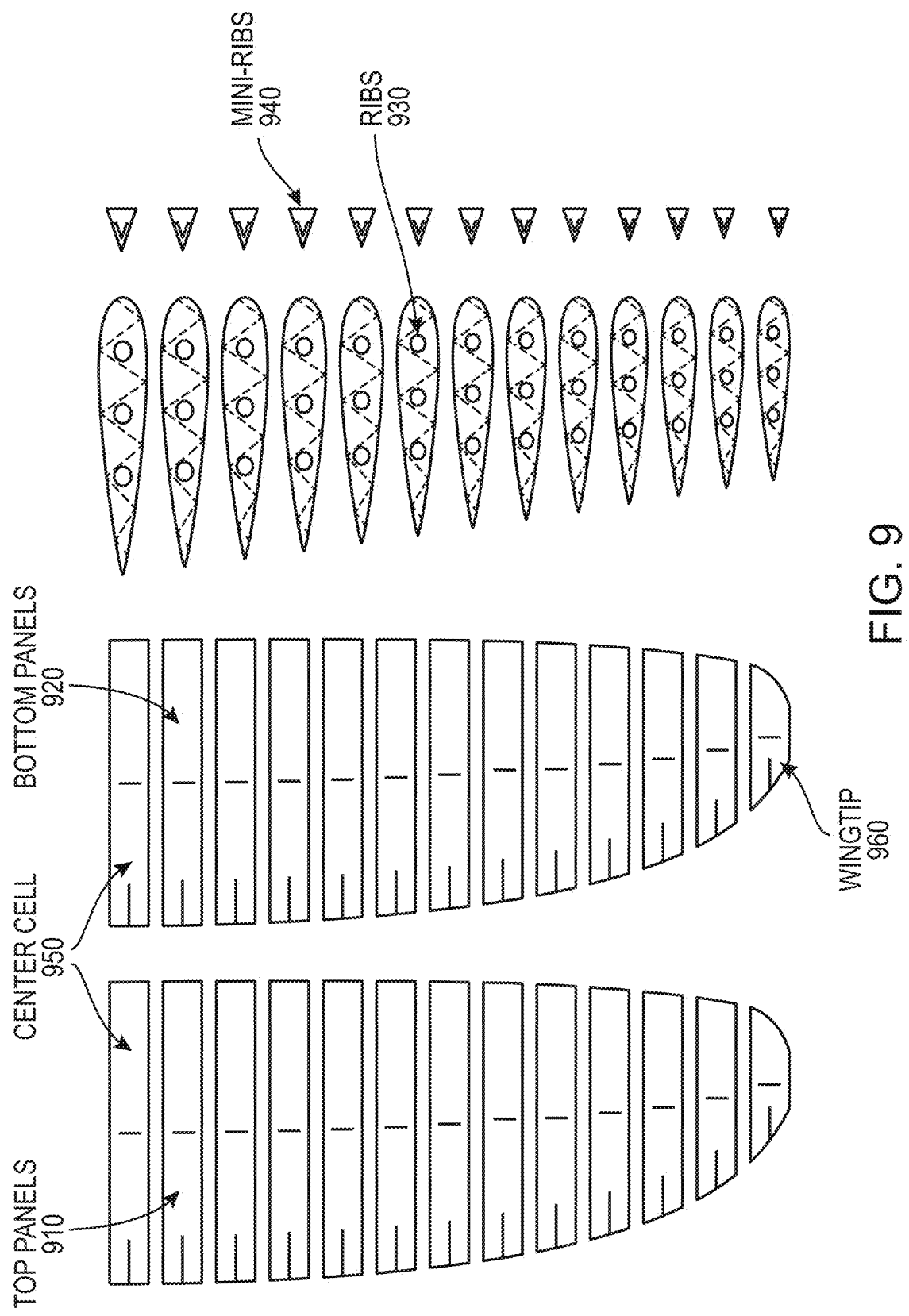
FIG. 9 is an example embodiment illustrating scalable panel plans for half of an inflatable wing, including top panels, bottom panels, ribs, mini-ribs, center cell, and wingtip, in accordance with an embodiment of the current disclosure.

Refer now to the example embodiment of FIG. 9, which is a CAD drawing of flat panels that are laser-cut and assembled to construct an inflatable wing. Top surface panels 910 attach to bottom surface panels 920. Top 910 and bottom 920 surface panels are the largest panels and make up the outer surface of the wing. Ribs 930 and mini-ribs 940 are internal components and are not visible from outside of the wing. These plans show half of the wing, with the panels ranging from the center cell 950 to the wingtip 960. The other half of the wing is constructed from the same panels, installed in reverse. Building the inflatable wing requires two of each panel shown in this image. In some embodiments, the plan of FIG. 9 may be scalable to any size of wing desired.

Figure 10:
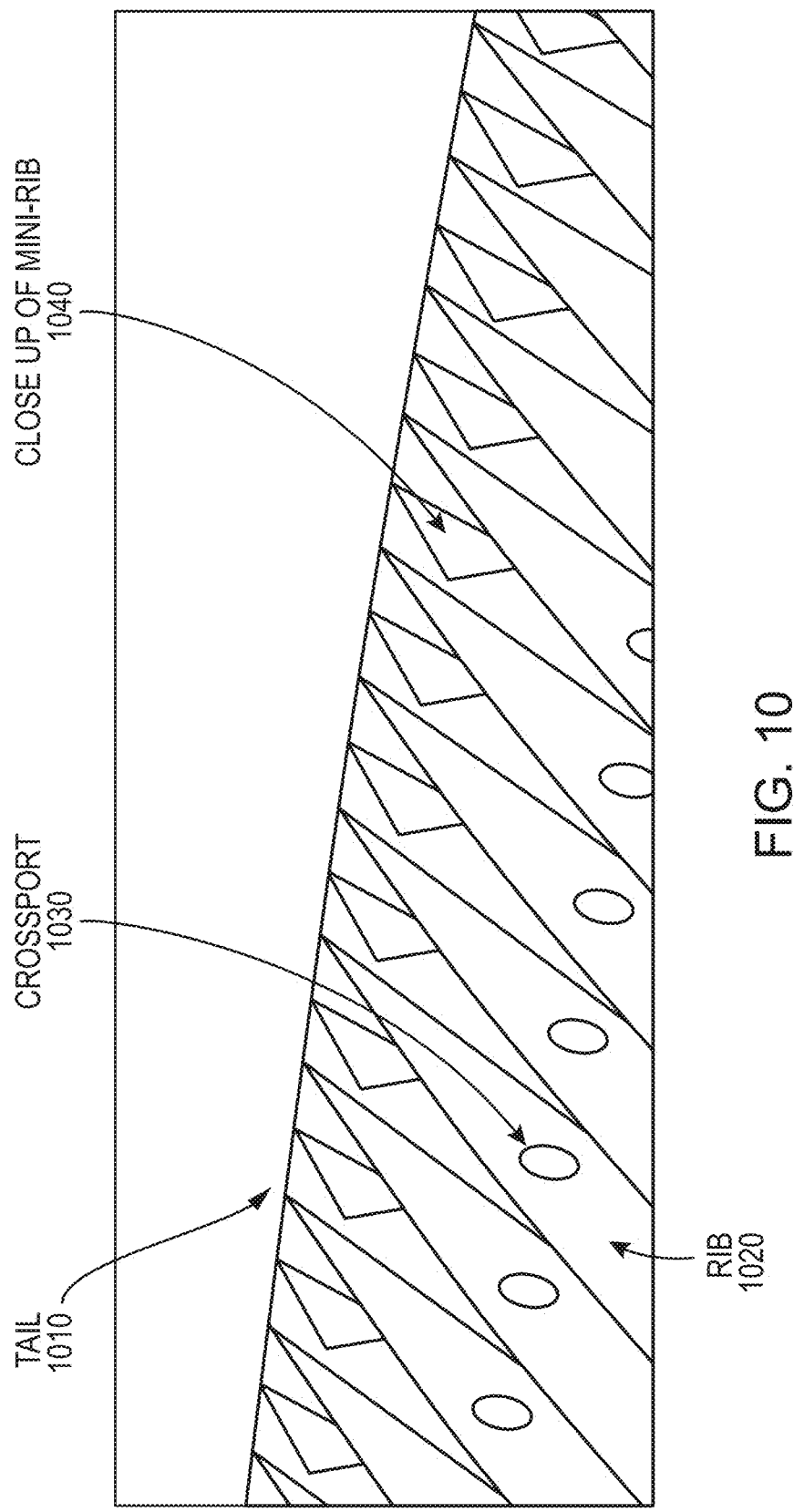
FIG. 10 is an example embodiment of a computer-generated close-up of the back portion of the inflatable wing's structure, including tail, rib, crossport, and mini-rib, in accordance with an embodiment of the current disclosure.

Refer now to the example embodiment of FIG. 10, which illustrates a computer generated close-up view of the back portion of an inflatable wing. Tail 1010 is shown from a top view of the inflatable wing. The ribs extend all the way to the end of tail 1010, such as rib 1020. Ribs have crossports to allow air flow, such as crossport 1030. Crossports allow for air pressure equalization between all cells. Mini-ribs are situated between normal ribs, as can be seen with mini-rib 1040.

Figure 11:
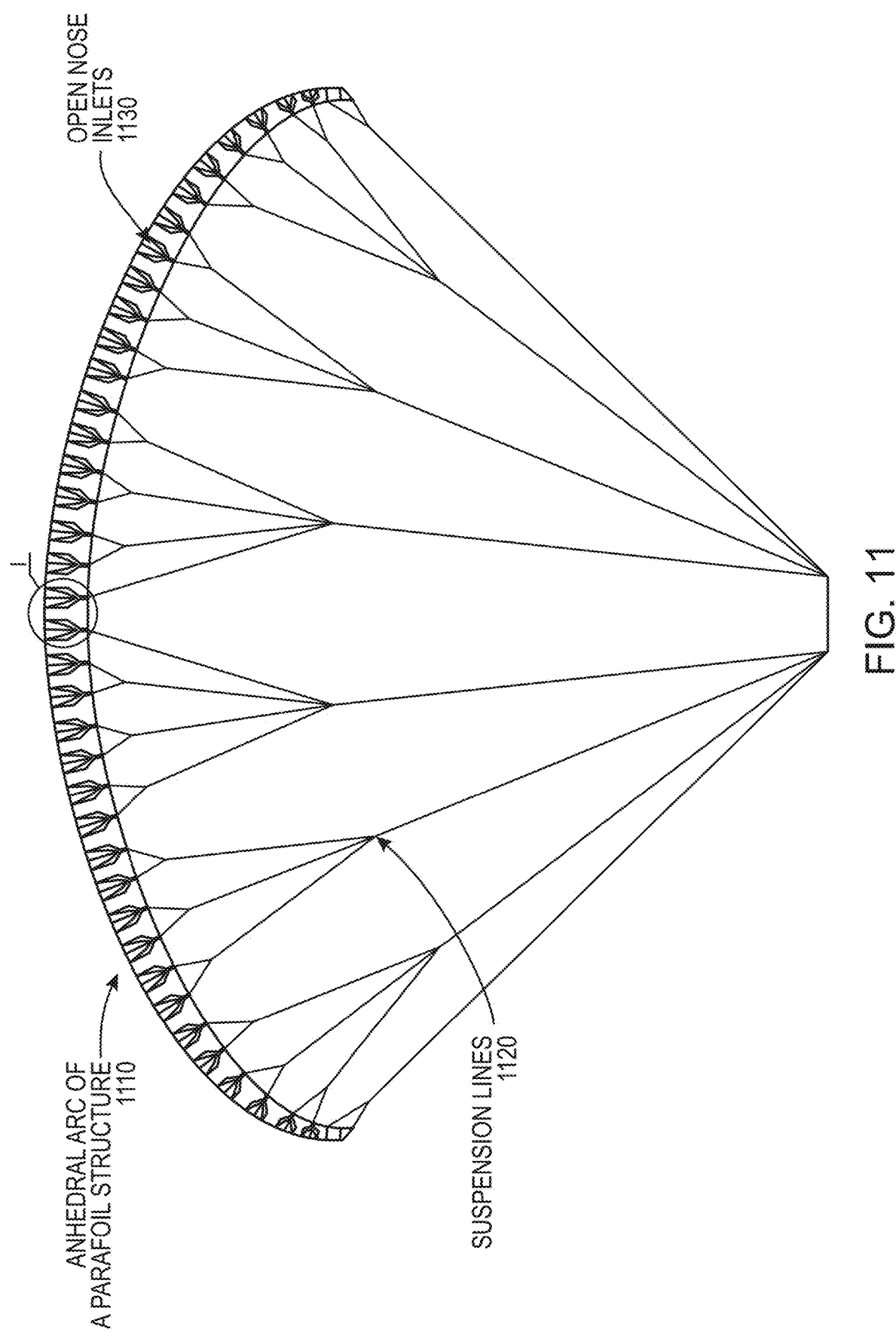
FIG. 11 is an example embodiment illustrating a figure showing ram-air paraglider with an anhedral arc of a parafoil structure, suspension lines, and open nose inlets, in accordance with an embodiment of the current disclosure.

Refer now to the example embodiment of FIG. 11, which illustrates a front-view of a typical ram-air paraglider, used to show the similarities and differences in construction with an inflatable wing. Ram-air paragliders have an anhedral arc 1110 due to the construction with suspension lines carrying the payload or pilot while an inflatable wing has a dihedral arc. Suspension lines 1120 are used to carry the pilot or payload, while an inflatable wing allows for direct attachment to an aircraft. The ram-air paraglider has open inlets in the nose 1130 while an inflatable wing has a sealed nose.

Figure 12:
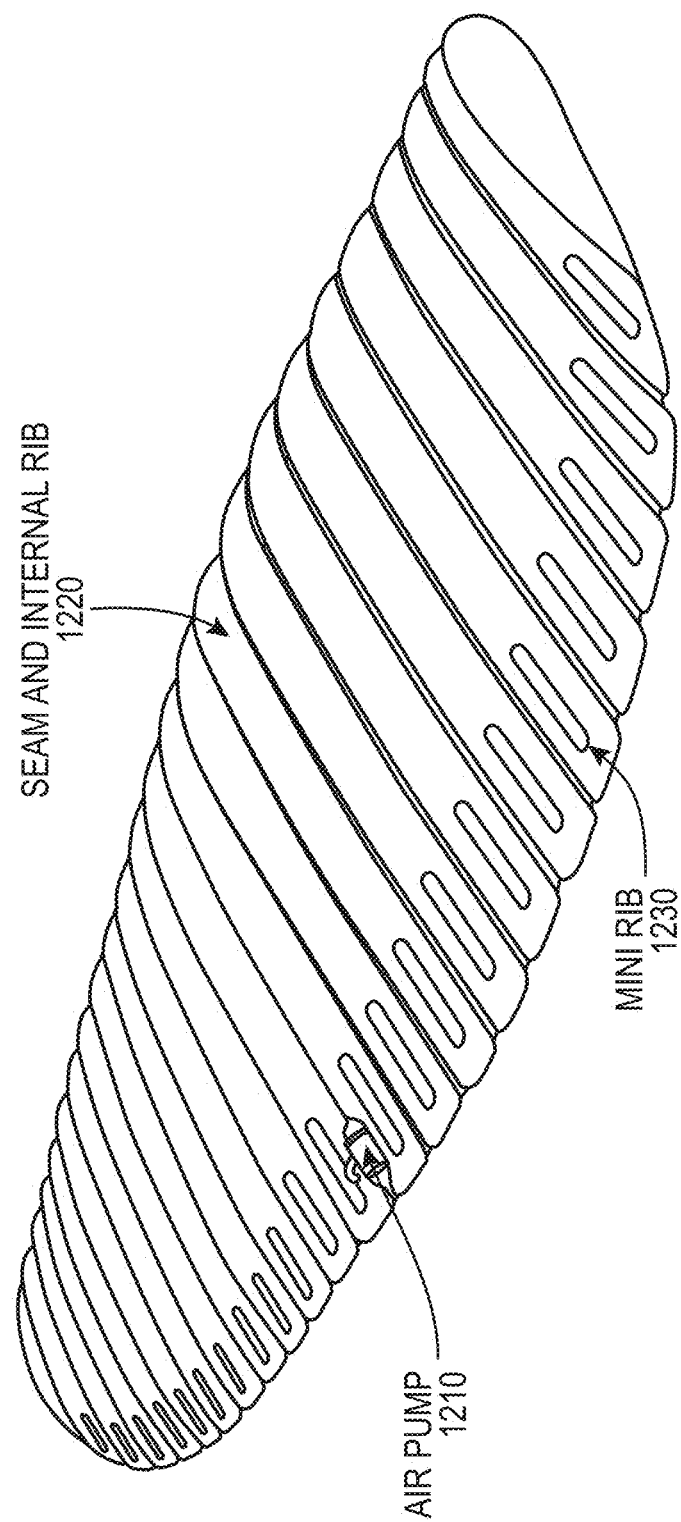
FIG. 12 is an example embodiment of an inflatable wing in the larger size, including its air pump, seam with internal rib, and mini-rib, in accordance with an embodiment of the current disclosure.

Refer now to the example embodiment of FIG. 12, which is a top-rear-right view of a larger sized inflatable wing. It is constructed from composite materials in accordance with the CAD drawing in FIGS. 1, 2, and 3. Visible is air pump 1210 for inflation and deflation. The sealed seams, such as seam 1220, connect the top and bottom surfaces to the internal vertical ribs. Mini-ribs, such as mini-rib 1230, flatten the tail and reduce the termination angle, increasing efficiency.

Figure 13:
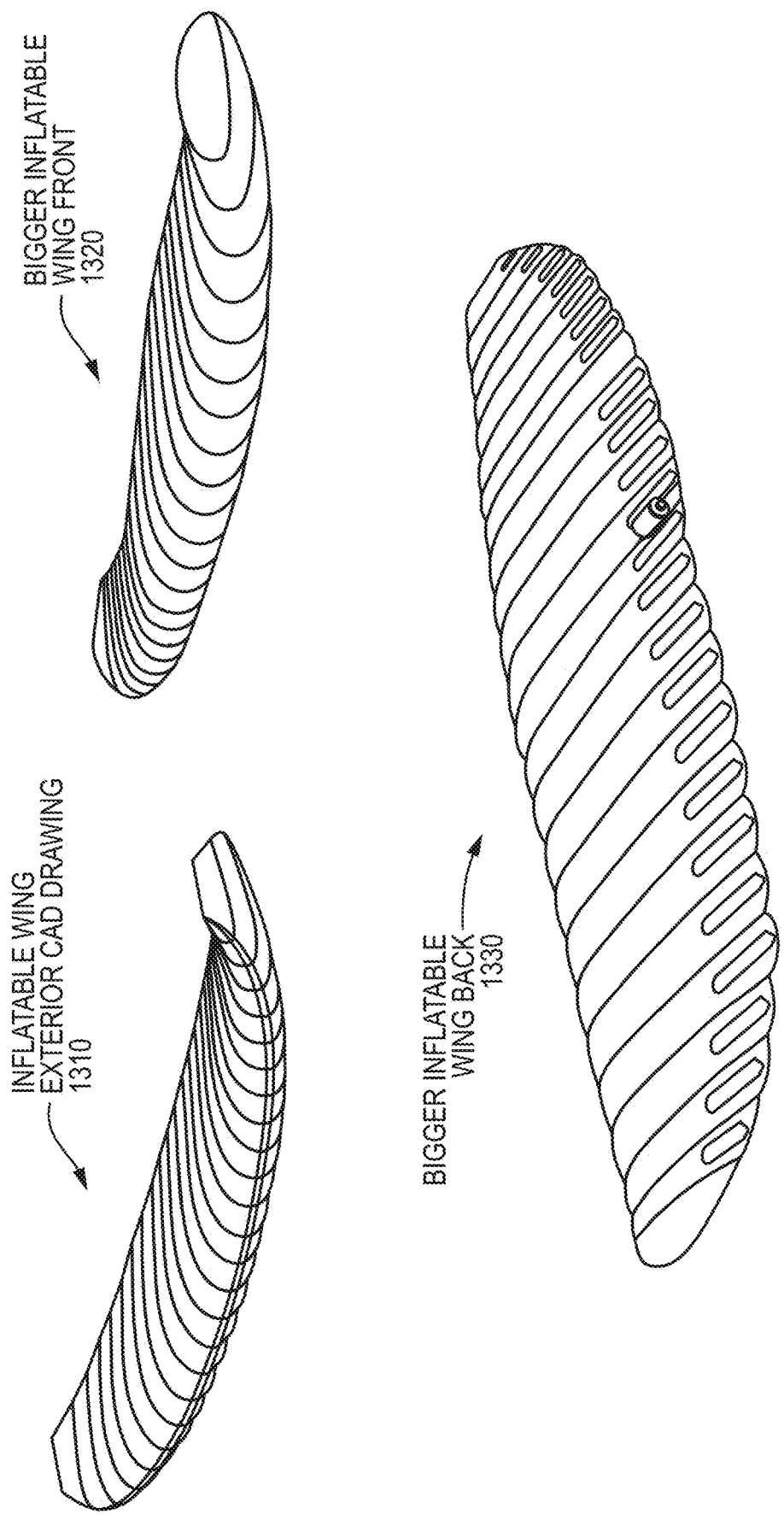
FIG. 13 illustrates three example embodiments of an inflatable wing, one of which is a CAD drawing of the exterior, and two of which are the same larger-scale version of an inflatable wing—one viewed from the front side and one viewed from the back side, in accordance with an embodiment of the current disclosure.

Refer now to the example embodiment of FIG. 13, which illustrates a comparison of the CAD drawing in FIGS. 1, 2, and 3 with an actual wing that is built from composite materials. The actual wing shown is the larger version of an inflatable wing. Inflatable wing exterior CAD drawing 1310 can be scaled larger or smaller depending on preference. CAD drawing 1310 and actual wing front view 1320 have the same dimensions on the panels, resulting in nearly identical shaping. Inflatable wing back view 1330 shows some billowing due to the internal air pressure.

In certain embodiments, an inflatable wing may continuously inflate or have a pump running continuously. In some embodiments, an inflatable wing may continuously inflate to compensate for any small holes. In certain embodiments, an inflation pump may continue running while an inflatable wing is in use to compensate for pinholes. In other embodiments, a pump may turn on and off as needed to inflate the wing. In certain embodiments, a pressure sensor may trigger a pump to turn on and off to inflate the wing during use. In other embodiments, a pump may be turned on or off via a wireless signal or a switch.

In some embodiments, an inflatable wing may not have crossports and each cell of the inflatable wing may be individually sealed. In certain embodiments, an inflatable wing may have an internal tube running through the wing acting as a manifold. In some embodiments, each cell may be individually sealed by adding a check valve inside of each cell.

Figure 14:
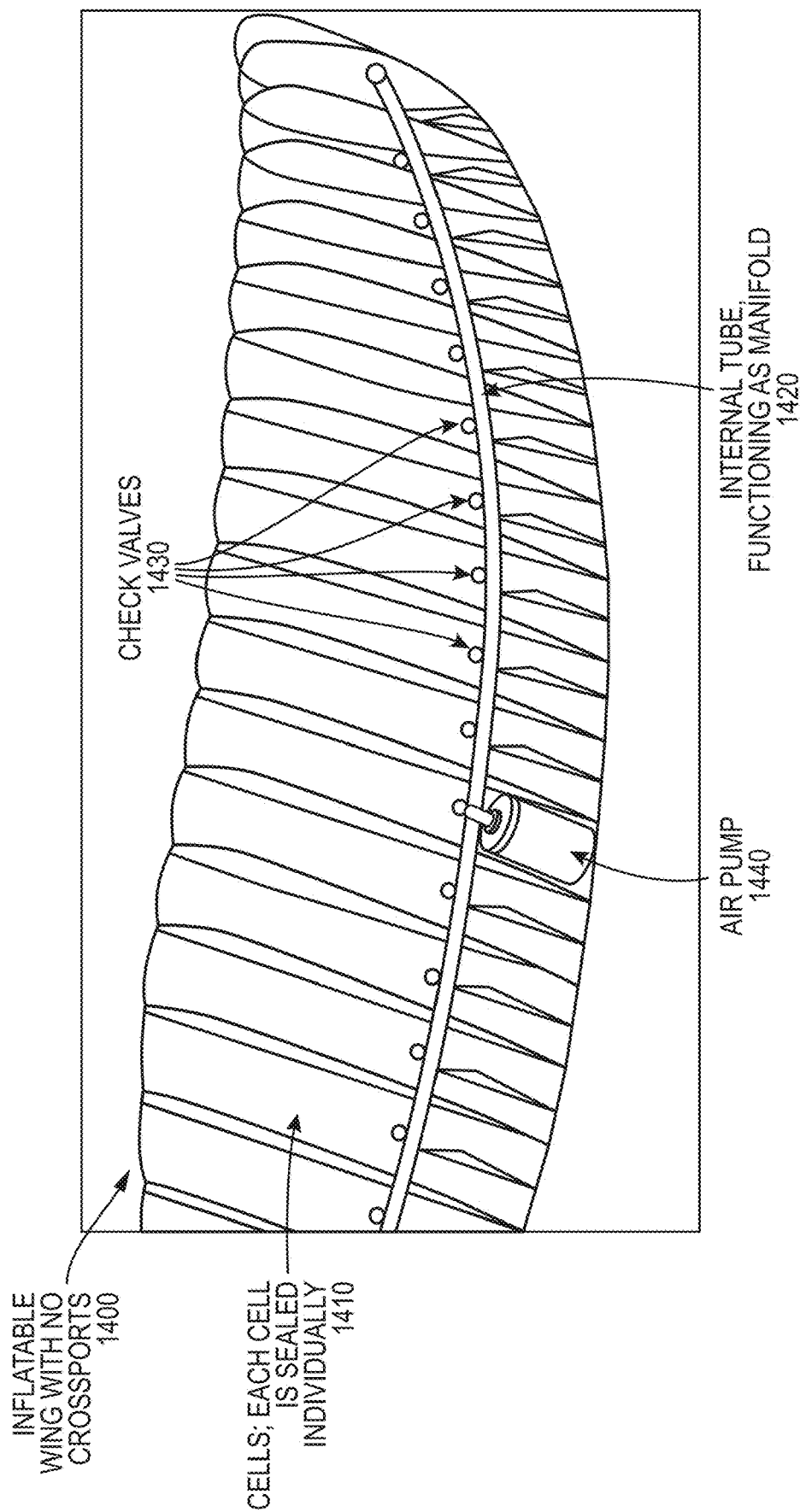
FIG. 14 is an example embodiment of an inflatable wing without crossports, having each cell individually sealed, an internal tube functioning as a manifold, check valves, and an air pump, in accordance with an embodiment of the current disclosure.

Refer now to the example embodiment of FIG. 14, which illustrates an inflatable wing with an internal manifold. Inflatable wing 1400 has no crossports between cells. Cells 1410 are individually sealed. Internal tube 1420 runs through all cells serving as a manifold. Check valves 1430 located inside each individual cell enable each cell to remain inflated if another cell has a puncture or becomes deflated.

Figure 15:
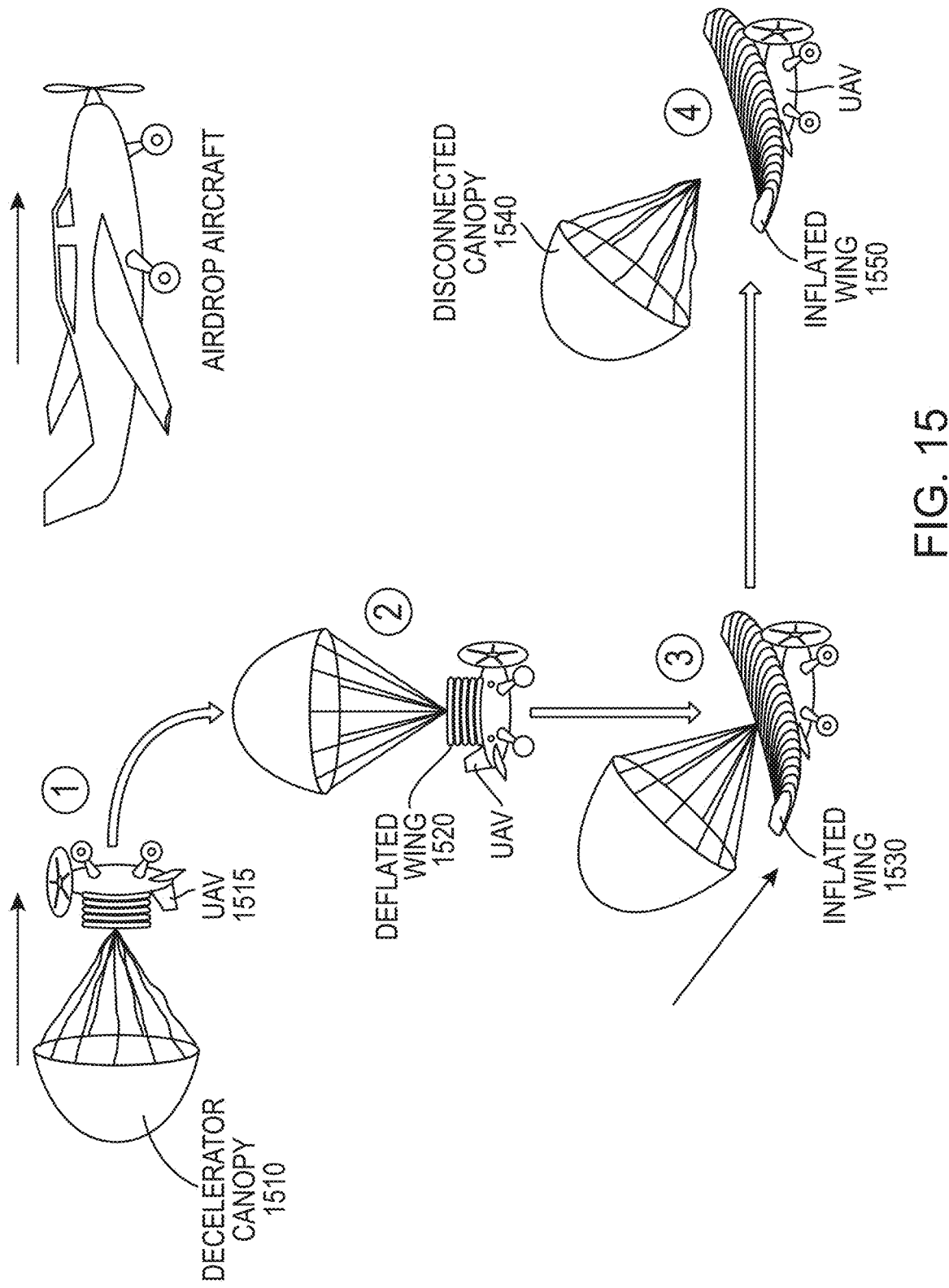
FIG. 15 illustrates a process of airdropping an inflatable wing and an attached UAV from an aircraft, including dropping with deceleration canopy, stabilization with deflated wing, inflation of wing, and disconnection of canopy leading to unmanned flight of a UAV, in accordance with an embodiment of the current disclosure.
Figure 16:
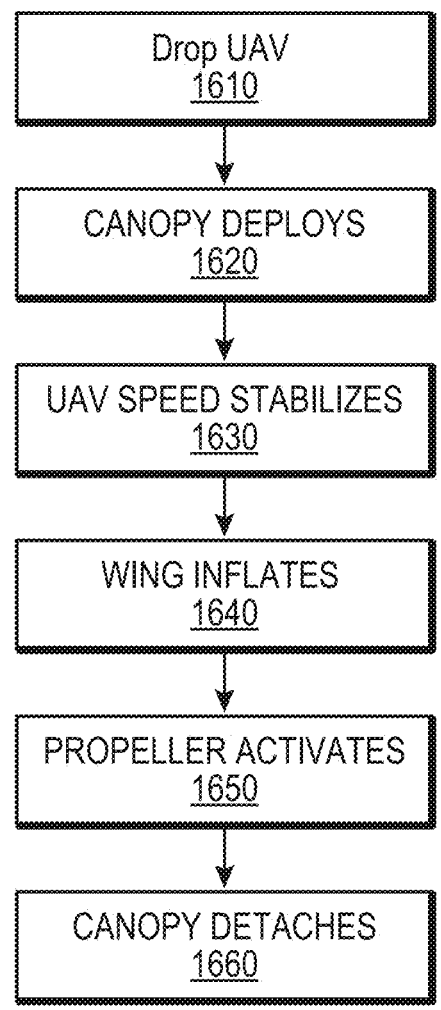
FIG. 16 is an example embodiment of a method for airdropping a UAV, in accordance with an embodiment of the current disclosure.

Refer now to the example embodiments of FIGS. 15 and 16, which illustrate deployment of an UAV with an inflatable wing. UAV 1515 is airdropped with a deflated inflatable wing and a round canopy 1510 (step 1610). Round canopy 1510 is deployed via a static line to slow descent of UAV 1515 (step 1620). UAV 1515 speed stabilizes as round canopy 1510 slows descent of UAV 1515 (step 1636). Inflatable wing 1530 is inflated by activating a pump (step 1640). A propeller on UAV 151 is activated to create forward motion and transition UAV from descent to forward motion (step 1650). Canopy 1510 is detached or otherwise deactivated (step 1660).

In some embodiments, an inflatable wing may have a set of zippers that may enable the geometry of the inflatable wing to be modified. In a particular embodiment, if an inflatable wing has zipper seams on it top surface, connecting cells adjacent to an inflatable bladder, then the wing may be reconfigured to be either a dihedral or an anhedral wingtip arc prior to inflation. In some embodiments, leaving a seam zipped up may result in a dihedral wingtip arc when the wing is fully inflated, which may provide extra stability and making it easier to learn how to fly an aircraft connected to a wing. In some embodiments, with an inflatable wing with unzipped seams on an inflatable wing may result in an anhedral wingtip arc when inflated, removing some stability and allowing more advanced maneuverability of an aircraft connected to the inflatable wing.

In some embodiments, an inflatable wing with a zipper system may add or remove a cell from the top surface of the wing, maintaining a consistent number of cells on a bottom surface of the inflatable wing, forcing the wingtip into either an upward dihedral configuration, or a downward anhedral configuration. In many embodiments, changing the geometry of an inflatable wing may allow for varying degrees of maneuverability, and may allow adjustment for varying skill levels without changing wings.

Refer now to the example embodiment of FIG. 17, which illustrates an inflatable wing with a zipper system where the zipper is closed resulting in a wing with a dihedral arc. Dihedral arc wing 1700 has center cell 1710, zipper seam 1715, expandable cell 1720, and wingtip 1730. Dihedral arc wing 1700 forms a dihedral arc. Zipper 1715 is closed, which constricts expandable cell 1720. Expandable cell 1720 is fully inflated but constrained by closed zipper 1715. The construction of expandable cell 1720 give dihedral arc wing 1700 its dihedral arc.

Refer now to the example embodiment of FIG. 18, which illustrates an inflatable wing with a zipper system where the zipper is opened resulting in a wing with an anhedral arc. Anhedral arc wing 1800 has center cell 1810, zipper seam 1815, expandable cell 1820, and wingtip 1825. Anhedral arc wing 1800 forms an anhedral arc. Zipper 1815 is open, which allows expandable cell to expand 1820. Expandable cell 1820 is fully inflated but unconstrained by opened zipper 1815. The construction of expandable cell 1820 give anhedral arc wing 1800 its anhedral arc.

Refer now to the example embodiment of FIG. 19, which illustrates using fiberglass rods with an inflatable wing. Wing 1900 references nose 1910 and tail 1920 for spatial orientation. In the example embodiment of FIG. 19, collapsible fiberglass rods 1940 attach to the bottom surface of wing 1900 to provide additional structure and to provide a place to mount the wing onto an UAV. Collapsible fiberglass rods 1940 are placed through fabric loops 1930. In some embodiments, fiberglass may distribute the load and contribute rigidity to the wing. In some embodiments, a UAV or aircraft may attach to fiberglass rods with a collar or hose clamp.

In some embodiments, fabric loops on the bottom surface of the wing may be used for attachment points. In certain embodiments, two collapsible fiberglass rods, such as may be used in a tent, may be inserted into fabric loops spanwise, providing structure to a wing and allowing a point for attachment to a UAV. In some embodiments, collapsible poles may allow for easy transportation with a deflated wing. In certain embodiments, use of two fiberglass rods may allow for pitch control from an UAV. In some embodiments, circular clamps on a mounting frame on the UAV may provide strength and rigidity.

In most embodiments, an inflatable wing may enable a portable UAV. In many embodiments, an inflatable wing may be collapsed or deflated for ease of storage or transportation where a normal wing is rigid and non-collapsible. In most embodiments, an inflatable wing may provide the benefits of a fixed wing in a collapsable form. In some embodiments, an inflatable wing may offer the portability benefits of a ram-air wing with the efficiency of a fixed wing. In some embodiments, an inflatable wing may have mini-ribs. In other embodiments, an inflatable wing may be paired with a UAV to increase portability.

In some embodiments, if an inflatable wing does not have crossports, each cell may be individually sealed. In certain embodiments, an inflatable wing may have crossports that have pressure switches that may be sealed or unsealed depending on the pressure in a cell containing the crossport. In certain embodiments, an inflatable wing may have run an internal tube acting as a manifold and each cell may remain individually sealed by a check valve inside of each individual cell. In some embodiments, a continually running pump may compensate for the majority of deflation events without the need for a manifold.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. An unmanned aerial vehicle comprising:
   an inflatable wing, the inflatable wing having an inflation valve, a top portion, a bottom portion, the top portion connected to the bottom portion to create a sealed volume, and internal to the sealed volume created by the top portion and the bottom portion a set of internal cells and a zipper configured to constrain inflation of the inflatable wing to change a bend in the inflatable wing from a dihedral arc in a first zipper state to an anhedral arc in a second zipper state;
   an air pump connected to the inflation valve; and
   a vehicle portion connected to the inflatable wing.

2. The unmanned aerial vehicle of claim 1 comprising composite fabrics.

3. The unmanned aerial vehicle of claim 2 wherein the composite fabrics are arranged to form the inflatable wing and each seam where at least two pieces of fabric are aligned and held together by one of the group selected from sewing and adhesives.

4. The unmanned aerial vehicle of claim 1 wherein the inflatable wing further has an internal manifold.

5. The unmanned aerial vehicle of claim 2 wherein the inflatable wing further has a set of check valves, wherein the set contains a check valve for each cell of the cells; wherein each check valve is able to retain pressure in its respective cell if another cell of the cells is punctured.

6. The unmanned aerial vehicle of claim 1 further comprising a deceleration parachute; wherein the deceleration enables slowing of the UAV to allow air deployment of an inflatable wing.

7. The unmanned aerial vehicle of claim 1 wherein the inflatable wing further has a collapsible fiberglass rod, the collapsible fiberglass rod providing structure and enabling mounting of the inflatable wing to the vehicle portion.

8. The unmanned aerial vehicle of claim 1 wherein the inflatable wing further has a set of mini-ribs.

9. The unmanned aerial vehicle of claim 1 wherein the inflatable wing further has a variable cell; where inflation or deflation of the variable cell modifies wingtip geometry of the inflatable wing.

10. The unmanned aerial vehicle of claim 1 wherein the inflatable wing further has cross-bracing to connect mounting points for inflatable wing.

11. The unmanned aerial vehicle of claim 7 wherein the vehicle portion is connected to the inflatable wing through a set of suspension lines connected to the mounting points provided by the fiberglass rod.

12. The unmanned aerial vehicle of claim 1 further comprising a deacceleration canopy.

13. The unmanned aerial vehicle of claim 12 wherein the air pump is battery powered.

14. The unmanned aerial vehicle of claim 13 wherein the inflatable wing has an internal manifold tube running through it.

15. An inflatable wing comprising:
- an inflation valve;
- a top portion;
- a bottom portion connected to the top portion to create a sealed volume;
- a set of internal cells internal to the sealed volume; and
- a zipper configured to constrain inflation of a portion of the inflatable wing to change a bend in the inflatable wing from a dihedral arc in a first zipper state to an anhedral arc in a second zipper state.

* * * * *